United States Patent [19]

Nakazawa et al.

[11] Patent Number: 5,095,198
[45] Date of Patent: Mar. 10, 1992

[54] IMAGE SHAKE COMPENSATING DEVICE

[75] Inventors: Isao Nakazawa; Tatsuo Fjuisaki; Masanori Ohtsuka, all of Kanagawa, Japan

[73] Assignee: Canon Kabushiki Kaisha, Tokyo, Japan

[21] Appl. No.: 428,247

[22] Filed: Oct. 27, 1989

[30] Foreign Application Priority Data

Oct. 31, 1988 [JP] Japan .................. 63-275683
Oct. 31, 1988 [JP] Japan .................. 63-275684
Nov. 18, 1988 [JP] Japan .................. 63-292164

[51] Int. Cl.⁵ .............................................. G01J 1/20
[52] U.S. Cl. ................................. 250/201.8; 354/407
[58] Field of Search .......................... 250/201.8, 204; 354/402, 403, 406–408, 430, 443

[56] References Cited

U.S. PATENT DOCUMENTS

| 4,176,928 | 12/1979 | Nakamura et al. | 354/407 |
| 4,203,031 | 5/1980 | Kamachi et al. | 250/201.3 |
| 4,223,988 | 9/1980 | Jyojiki et al. | 354/407 |
| 4,709,138 | 11/1987 | Suda et al. | 250/201.8 |
| 4,733,264 | 3/1988 | Hatase et al. | 354/430 |

Primary Examiner—Edward P. Westin
Assistant Examiner—S. Allen
Attorney, Agent, or Firm—Robin, Blecker, Daley & Driscoll

[57] ABSTRACT

An image shake compensating device includes a compensating member for compensating for an image shake taking place on an image forming plane of an optical instrument; a detecting circuit for detecting, through the displacement state of the compensating member, the shaking state of the optical instrument causing the image shake; and a driving circuit for driving the compensating member in response to an output of the detecting circuit.

28 Claims, 22 Drawing Sheets

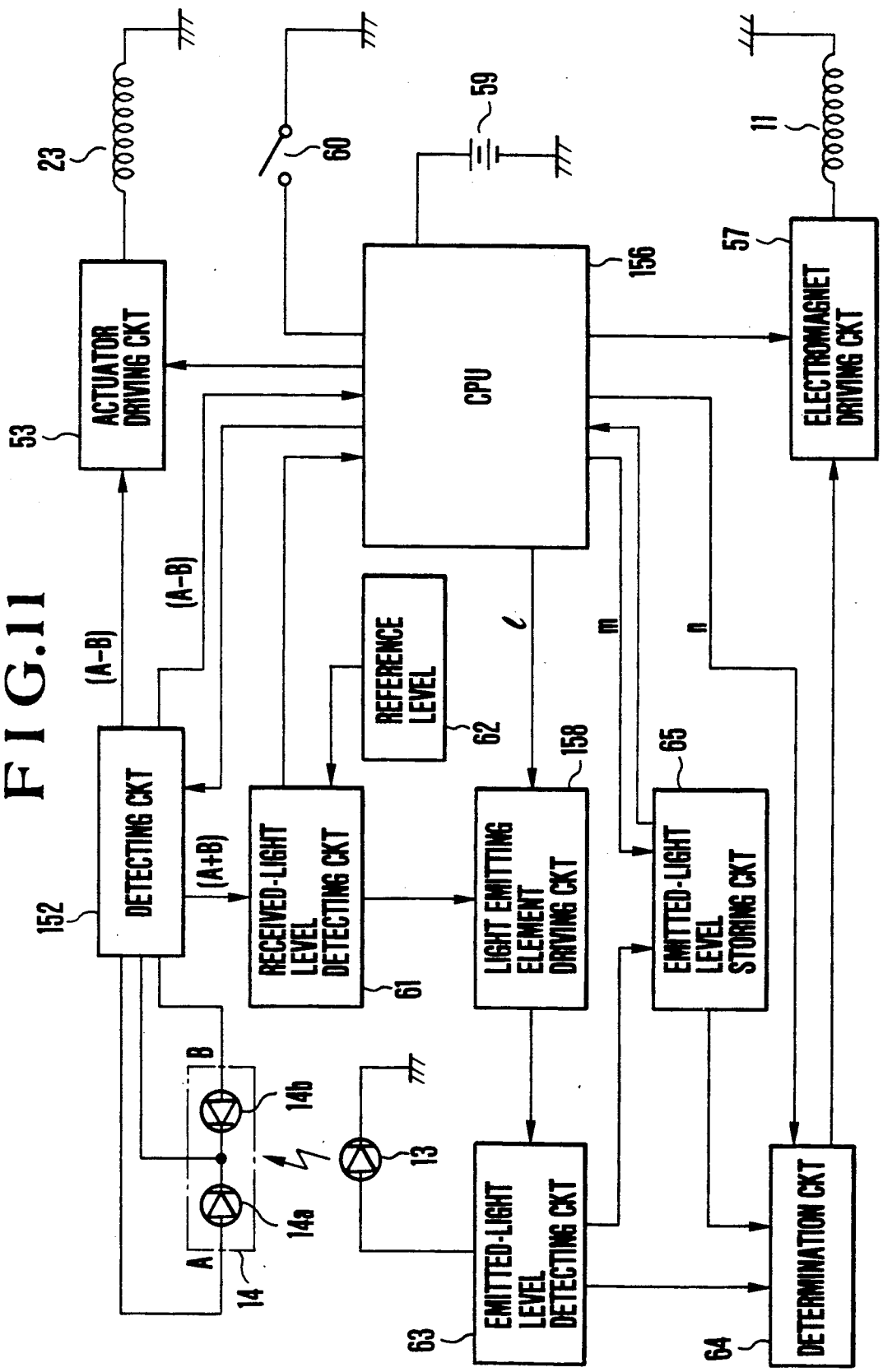

FIG.12
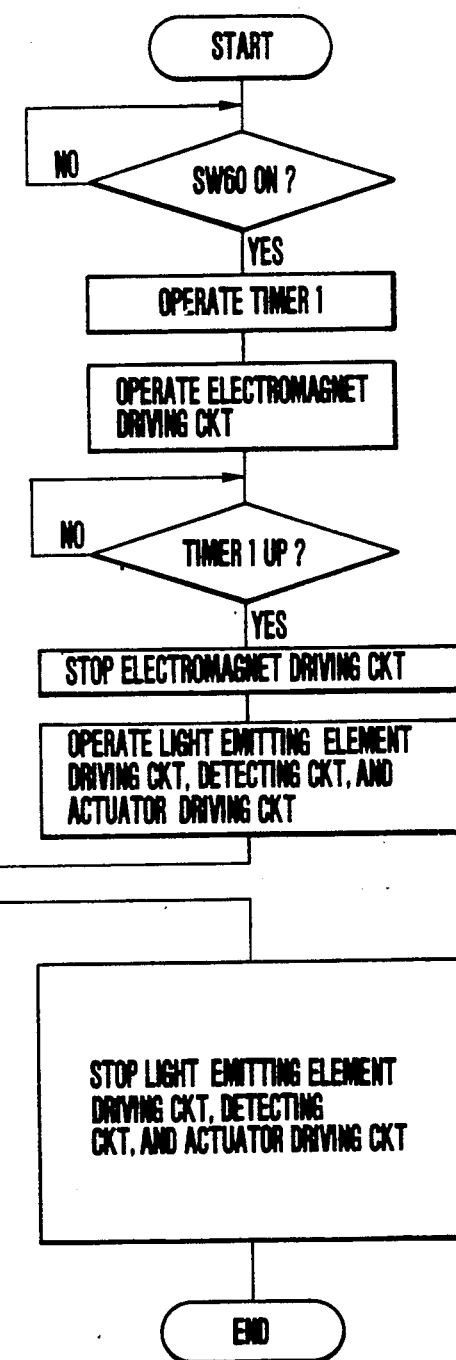
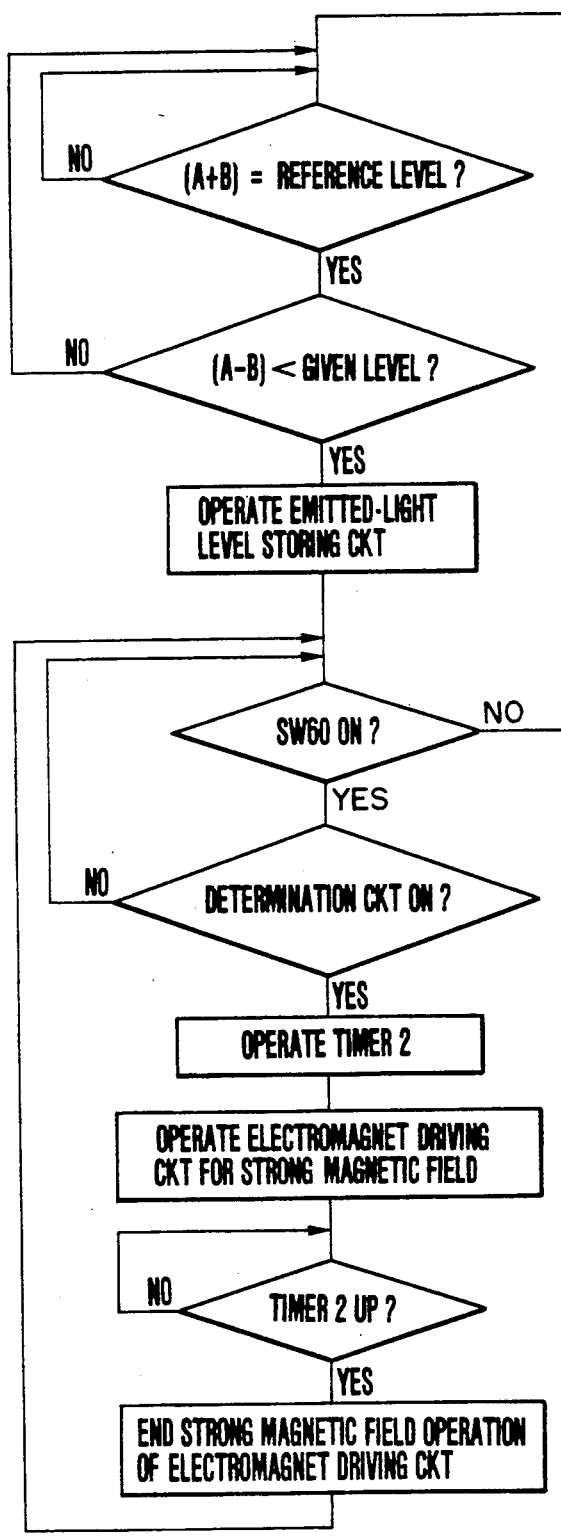

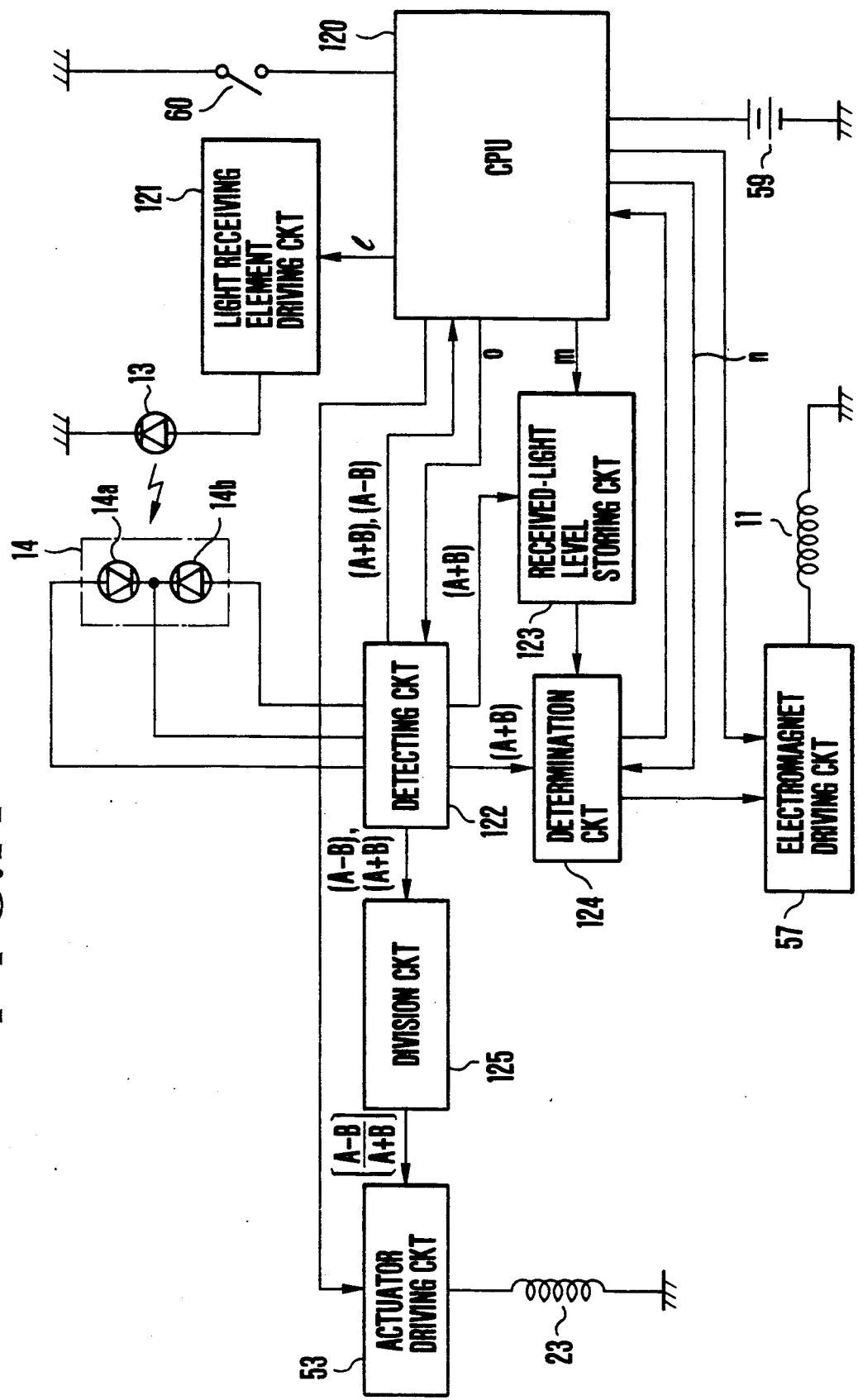
F I G. 14

IMAGE SHAKE COMPENSATING DEVICE

BACKGROUND OF THE INVENTION

1. Field of the Invention

This invention relates to an image shake compensating device for an optical monitoring apparatus, an optical instrument such as a still camera or the like.

2. Description of the Related Art

Image shake compensating devices of varied kinds have recently been proposed for still cameras. Still cameras equipped with such devices are being developed.

The known image shake compensating devices are generally arranged to include a shake detector which detects a shaking state (acceleration, speed of displacement) of an optical instrument such as a camera; a compensating optical system which is movable in the direction of offsetting an image shake resulting from shaking of the optical instrument in such a way as to prevent any image shake on the image forming plane of the optical instrument; a computing device for computing a degree of shake compensation to be made by the compensating optical system on the basis of the output of the shake detector; an actuator which drives the compensating optical system on the basis of the output of the computing device; a servo detector which detects the moving extent and the position of the compensating optical system; and a compensating optical system driving control device for driving the actuator on the basis of a difference between the output of the computing device and the output of the servo detector. The control system of the conventional image shake compensating device is as shown in a block diagram in FIG. 24 of the accompanying drawings. In FIG. 24, a compensating optical system moving degree detector represents the above-stated servo detector.

The conventional image shake compensating device which includes the above-stated control system necessitates the optical instrument to use the shake detector which detects shaking of the optical instrument and the compensating optical system moving degree detector which detects the moving degree of the compensating optical system. This requirement not only increases the size of the instrument but also requires use of a complex electronic circuit arrangement for complex control. This causes an increase in cost of the image shake compensating device and eventually in cost of the instrument.

SUMMARY OF THE INVENTION

This invention is directed to the solution of above-stated problem of the prior art. It is therefore an object of the invention to provide a novel image shake compensating device which can be arranged more compactly and at a lower cost than the conventional device.

It is another object of the invention to provide a novel image shake compensating device which permits reduction in size and cost of an optical instrument which is equipped with the image shake compensating device.

To attain the above-stated object, an image shake compensating device arranged according to the invention comprises: compensating means for compensating for an image shake occurring on the image forming plane of an optical instrument; detecting means for detecting, through the displacement of the compensating means, a shaking state of the optical instrument which is causing the image shake; and driving means for driving the compensating means in response to the output of the detecting means.

Other objects and features of this invention will become apparent from the following detailed description of embodiments thereof taken in connection with the accompanying drawings.

BRIEF DESCRIPTION OF THE DRAWINGS

FIG. 11 is a block diagram showing the electrical arrangement of an image shake compensating device arranged as a fourth embodiment of the invention.

FIG. 12 is a flow chart showing the control operation of the arrangement of FIG. 11.

FIG. 14 is a block diagram showing the electrical arrangement of the image shake compensating device of a fifth embodiment of the invention.

DETAILED DESCRIPTION OF THE PREFERRED EMBODIMENTS

Figure 1:
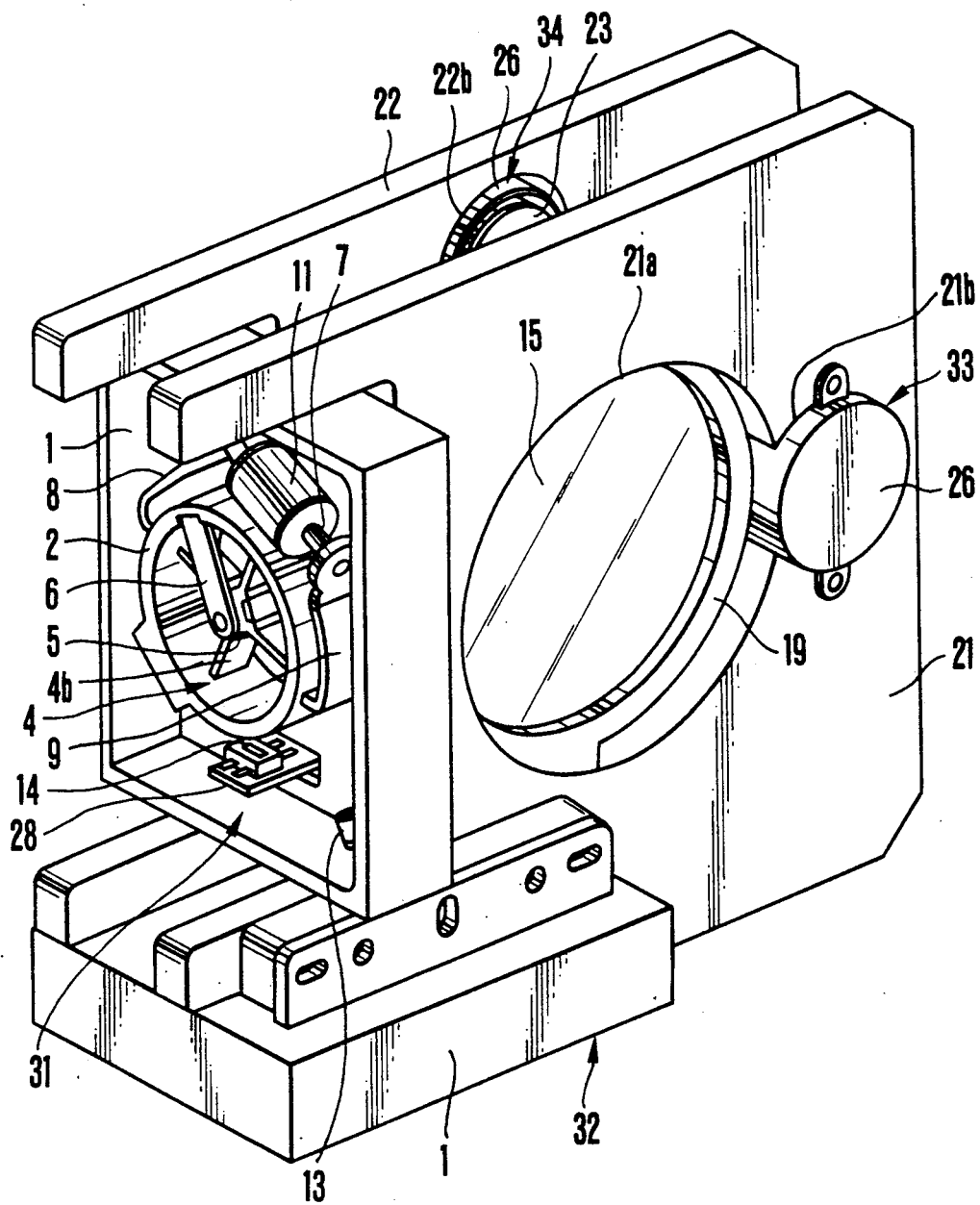
FIG. 1 is an oblique front view showing the mechanical structural arrangement of an image shake compensating device arranged as a first embodiment of the invention.
Figure 2:
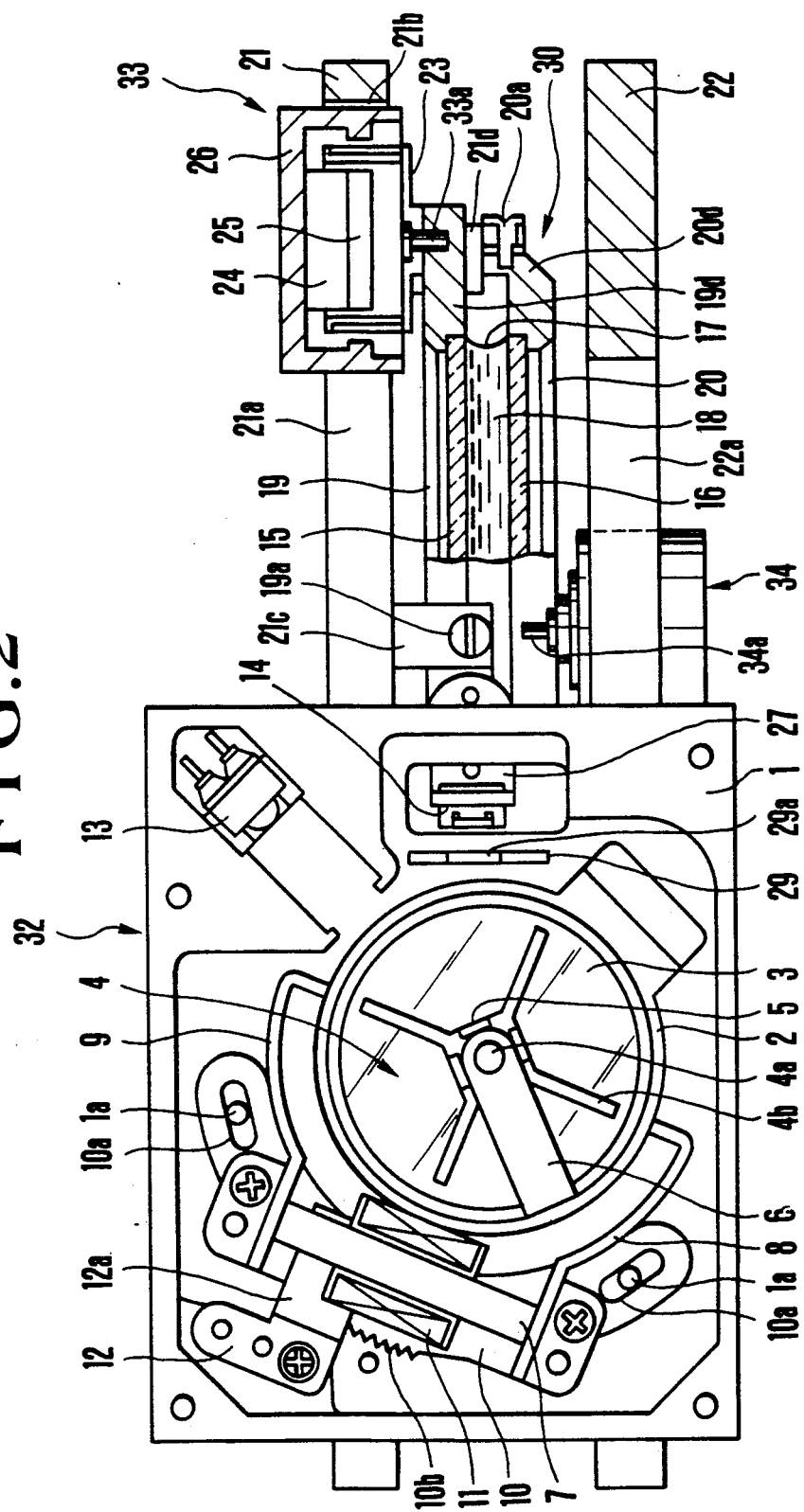
FIG. 2 is a partially sectional view taken horizontally across the essential parts, showing the device of FIG. 1 as viewed from below the device.
Figure 3:
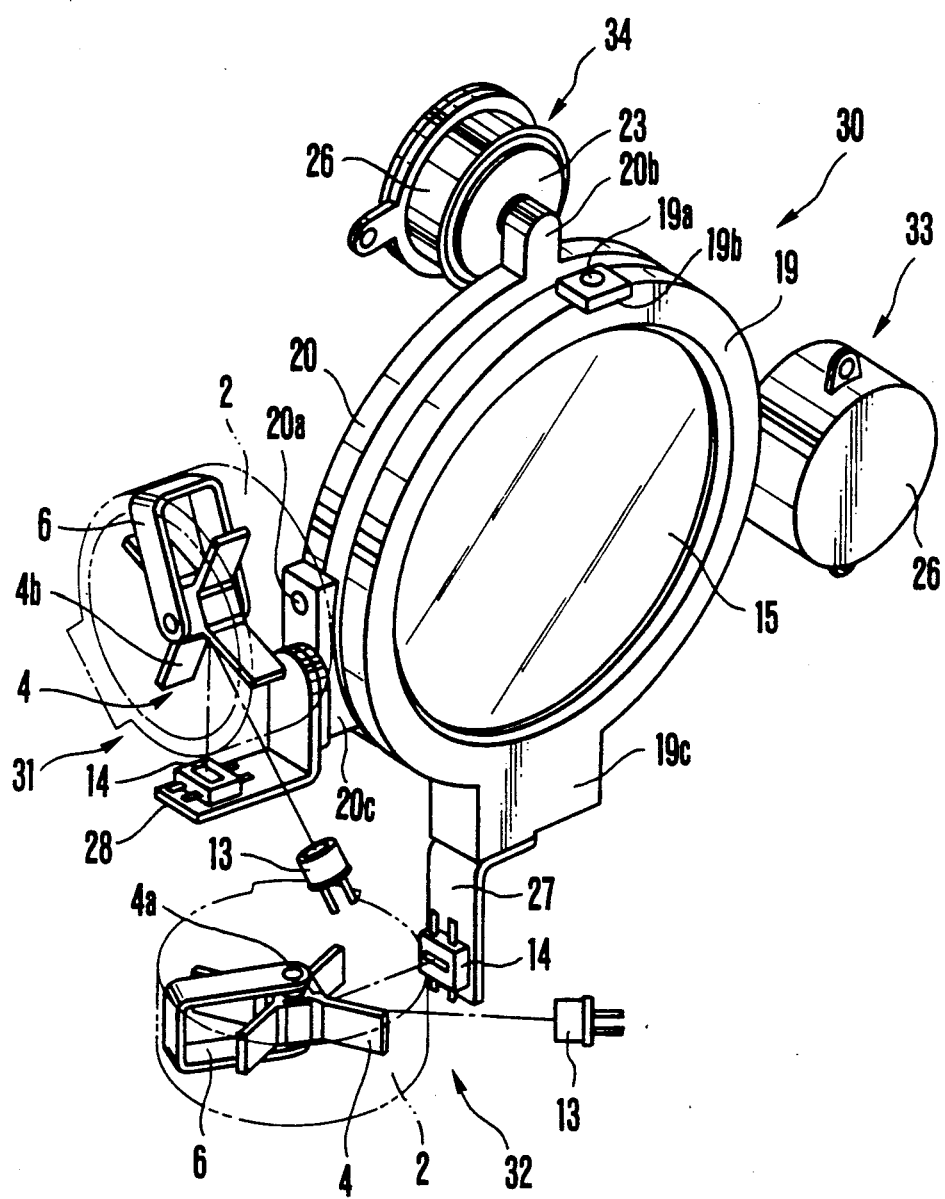
FIG. 3 is an oblique front view showing a compensating optical system 30, detectors 31 and 32 and compensating optical system driving actuators 33 and 34 as in a state of being taken out from the mechanical structural part of FIG. 2.

Referring to the drawings, embodiments of this invention are described as follows:

FIG. 1 is a oblique front view showing the mechanical structural arrangement of an image shake compensating device arranged according to the invention as a first embodiment thereof. FIG. 2 is a partially sectional view taken transversely across the essential parts of the same device, showing the device as viewed from below. FIG. 3 is an oblique view of the essential parts of a detector and those of a compensating optical system together with a compensating optical system driving actuator, showing them as in a state of being taken out from the arrangement of FIG. 1.

Referring to FIGS. 1 and 2, front and rear base plates 21 and 22 are fixedly disposed within an optical instrument such as a camera or the like and are arranged to carry a compensating optical system 30 and compensating optical system driving actuators 33 and 34. The front base plate 21 is provided with an optical path hole 21a and a hole 21b for carrying the compensating optical system driving actuator 33. The rear base plate 22 is provided with an optical path hole 22a (see FIG. 2) and a hole 22b for carrying the compensating optical system driving actuator 34. Further, a first detector 31 is attached to recessed parts formed on one side of the front and rear base plates 21 and 22. Meanwhile, a second detector 32 (see FIGS. 2 and 3) is attached to the edge parts of the base plates 21 and 22 on the same side. The first detector 31 is arranged to detect the rotary displacement of the optical instrument taking place around its horizontal axis. The first detector 31 faces sidewise as shown in FIGS. 1 and 3. The second detector 32 is arranged in the same manner as the first detector 31 but is positioned to face downward for the purpose of detecting the rotary displacement of the optical instrument taking place around the vertical axis thereof. The further details of the detectors 31 and 32 will be described later.

The compensating optical system 30 is composed of a variable angle prism and is disposed within a space formed between the front and rear base plates 21 and 22. The optical system 30 is carried jointly by the front and rear base plates 21 and 22. The variable angle prism which forms the compensating optical system 30 includes: an annular front frame 19; a circular front glass plate 15 which is secured to the front frame 19; an annular rear frame 20 which is disposed a given distance away from the front frame 19; a circular rear glass plate 16; a bellows type flexible tubular member 17 (see FIGS. 2) which is fitted on the end parts of the outer circumferences of the front and rear frames 19 and 20 and extends between these frames 19 and 20; and a transparent liquid 18 (see FIG. 2) which is sealed in a sealed chamber surrounded by the front glass plate 15, the rear glass plate 16 and the flexible tubular member 17.

As shown in FIG. 3, projections 19b and 19c which are provided with pin holes for rotatably inserting vertical pins 19a are formed at uppermost and lowermost parts of the outer circumference of the front frame 19. The pins 19a (only the lower pin 19a is shown in FIG. 2 and only the upper pin 19a in FIG. 3) are erected on a pair of upper add lower arms 21c. (Only the lower arms 21c is shown in FIG. 2.) The front frame 19 is thus carried by the front base plate 21 in such a way as to be rotatable on the pins 19a.

A light receiving element carrying plate 27 to which a light receiving element 14 included in the second detector 32 is attached is mounted on the lower projection 19c of the front frame 19. The light receiving element carrying plate 27 is arranged to serve as a connector for connecting the light receiving element 14 to the substrate of other circuits, a power source, etc.

A short, rightward protruding arm 19d is provided on one side edge of the front frame 19 as shown in FIG. 2. (An arm 20b which is of the same shape as this arm 19d is provided on the rear frame 20 as shown in FIG. 3.) The shaft 33a of the first compensating optical system driving actuator 33 (hereinafter referred to as the first actuator) is secured to the arm 19d.

The first actuator 33 is a so-called voice coil type electromagnetic plunger. The actuator 33 is composed of a cylindrical yoke 26 which is fixedly fitted into the hole 21b of the front base plate 21; a permanent magnet 24 fixedly positioned within the yoke 26; a pole piece 25 mounted on the permanent magnet 24; a coil 23 secured to the shaft 33a. The actuator causes the front frame 19 to turn round on the pin 19a with its shaft 33a moved backward by an electromagnetic force generated between the permanent magnet 24 and the coil 33 when a current is applied to the coil 23 in the forward direction.

Projections 20d (see FIG. 2) and 20c (FIG. 3) which resemble the above-stated projections 19b and 19c protrude from the outer circumferential face of the rear frame 20. In the projections 20d and 20c are provided pin holes which are arranged to permit a pair of horizontally extending pins 20a (see FIGS. 2 and 3) to be rotatably inserted therein. As shown in FIG. 2, the pins 20a are erected on arms 21d which extend backward from the rear side of the front base plate 21 (FIG. 2 shows only one of the pins 20a). The rear frame 20 is carried by the front base plate 21 to be rotatable on the pins 20a. In other words, the rear frame 20 can be turned round on a horizontal axis which is perpendicular to the optical axis of the compensating optical system 30. Further, as shown in FIG. 3, a light receiving element carrying plate 28 to which the light receiving element 14 of the first detector 31 is attached is mounted on the projection 20c. The light receiving element carrying plate 28 is arranged to serve also as a connector.

As shown in FIG. 3, a short arm 20b protrudes from an upper end part of the outer circumferential face of the rear frame 20. The shaft 34a of the second actuator 34 is secured to the arm 20b as shown in FIG. 2.

The second actuator 34 is a so-called voice coil type electromagnetic plunger of the same structure as that of the first actuator 33 and includes: a bottomed cylindrical yoke 26 which is fixedly fitted in the hole 22b of the rear base plate 22; a permanent magnet 24 which is secured to the yoke 26; a pole piece 25 which is mounted on the permanent magnet 24; and a coil 23 which is secured to a shaft 34a. When a forward current is applied to the coil 23, the shaft 34a is moved forward as viewed on FIG. 3. This causes the arm 20b of the rear frame 20 to be pushed forward. As a result, the rear frame 20 turns round clockwise on the pins 20a, i.e., clockwise on a horizontal axis.

The variable angle prism device arranged in the above-stated manner operates as follows: When at least either the front frame 19 or the rear frame 20 is turned round on the pins 19a or 20a, the front glass plate 15 or the rear glass plate 16 slants relative to a vertical plane. Then, rays of light incident on the front glass plate 15 deflect. As a result, an image on the image forming plane moves perpendicularly to the optical axis to compensate for an image shake.

Next, referring again to FIGS. 1, 2 and 3, the detectors 31 and 32 are arranged and function as follows: Since these detectors 31 and 32 are arranged in the same manner, the components parts of them are indicated by the same reference numerals. Each of the detectors 31 and 32 is an angular displacement detector of the kind called a hydrostatic sensor. In the case of the image shake compensating device of this embodiment, they serve as shake detectors for detecting a shaking state of the optical instrument (rotatory displacements on the horizontal and vertical axes and also function as servo detectors for detecting the moving degree of the compensating optical system.

In FIGS. 1 to 3, a reference numeral 1 denotes a box-like member which is secured to the front and rear base plates 21 and 22. A tubular member 2 is secured to the box-like member 1 and is filled with a transparent liquid, which is sealed therein. A vane-wheel shaped floating body 4 is arranged to be rotatable within the transparent liquid on a horizontal axis (in the case of the first detector 31) or on a vertical axis (in the case of the second detector 32). Four mirrors 5 which are provided with slits are attached respectively to the outer faces of the angular tube like bearing part of the floating body 4. A floating body carrying member 6 is provided with a pivot shaft for rotatably carrying the floating body 4 and is fixedly fitted into a groove formed in the inner circumferential wall of the tubular member 2 as shown in FIGS. 2 and. 3. A yoke 7 forms an electromagnet which is arranged to induce the vane part of the floating body 4 to a given position and to have it in repose there. Yokes 8 and 9 are connected to the two ends of the yoke 7 and have their ends in contact with the outer face of the tubular member 2. A floating body positioning device supporting base 10 is provided with a arcuate groove 10a which is formed to have its center on the shaft 4a of the floating body 4 and is arranged to permit slidable insertion therein of a pin 1a protruding from the inner wall face of the box shaped member 1. The support base 10 is also arranged to carry the yokes 7, 8 and 9. A coil 11 is fitted on the yoke 7 and forms the electromagnet jointly with the yoke 7. A leaf spring 12 is mounted on the box member 1 and has an arm part 12a arranged to urge the floating body positioning device supporting base 10 to move away from the tubular member 2. Light emitting elements (IRED) 13 are secured to the box member 1. Light receiving elements 14 are secured to light receiving element carrying plates 27 and 28 which are respectively secured to the front and rear frames 19 and 20 of the variable angle prism device as shown in FIG. 3. Masks 29 are disposed in front of the light receiving elements 14 and are secured to the light receiving element carrying plates 27 and 28.

The yokes 7 to 9 and the coil 11 jointly form a floating body positioning device which is arranged to induce the floating body 4 to a given position and to cause it to be in repose there. When the coil 11 is energized, a magnetic circuit is formed in a loop of the yoke 7 - the yoke 8 - the floating body 4 - the yoke 9 - the yoke 7. The fore end of the vane shaped part of the floating body 4 is attracted to a position where it is opposed to the fore ends of the yokes 8 and 9 to be electro-magnetically retained there as shown in FIG. 2.

The floating body positioning device supporting base 10 is arranged such that its position relative to the tubular member 2 can be changed by moving the arcuate groove 10a relative to the pin 1a, i.e., by turning round the support base 10 on the shaft 4a of the floating body 4. Therefore, the positions of the fore ends of the yokes 8 and 9 relative to the tubular part 2 can be changed. To enable the support base 10 to be turned round, the support base 10 is provided with a gear part 10b which is formed on the outer circumferential edge of the support base 10. The gear part 10b engages a gear which is not shown. The base 10 thus can be turned round by rotating this gear.

The light receiving elements 14 are formed by a known semiconductor position detecting element (PSD). The light receiving element carrying plates 27 and 28 are arranged to serve also as connectors for transmitting the output of each of the light receiving elements to a detecting circuit which will be described later.

Each of the detectors 31 and 32 mentioned in the foregoing is arranged to detect a shake (angular displacement) of the optical instruments based on the following principle. When the optical instrument moves round its horizontal or vertical axis, the tubular member 2, the light emitting element 13 and the light receiving element 14 which are in one body with the optical instrument turn round on the horizontal or vertical axis along with the optical instrument. However, the force of inertia of the transparent liquid 3 disposed within the tubular member 2 keeps the floating body 4 in its original position by preventing it from turning round on the shaft 4a. Therefore, the mirrors 5 attached to the floating body 4 are brought into a state of being turned round relative to the light emitting and receiving elements 13 and 14. As a result, the direction of light which comes from the mirrors 5 to the light receiving element 14 changes. The light receiving element 14 then produces an output showing the rotated position of the optical instrument.

The floating body positioning device which consists of the coil 11 and the yokes 7 to 9 is arranged to bring the arm 4b of the floating body 4 into a stationary state in a position at the fore ends of the yokes 8 and 9 before the detector 31 or 32 begins to operate. In other words, the detectors 31 and 32 are arranged to be reset with the floating body 4 set in its initial position. More specifically, the coil 11 is energized to have the magnetic circuit of the Yoke 7 - the yoke 8 - the floating body 4 - the yoke 9 - the yoke 7 formed immediately before the detector begins to operate. This brings the floating body 4 into its "zero" position as shown in FIG. 2 before the detector is reset.

Figure 4:
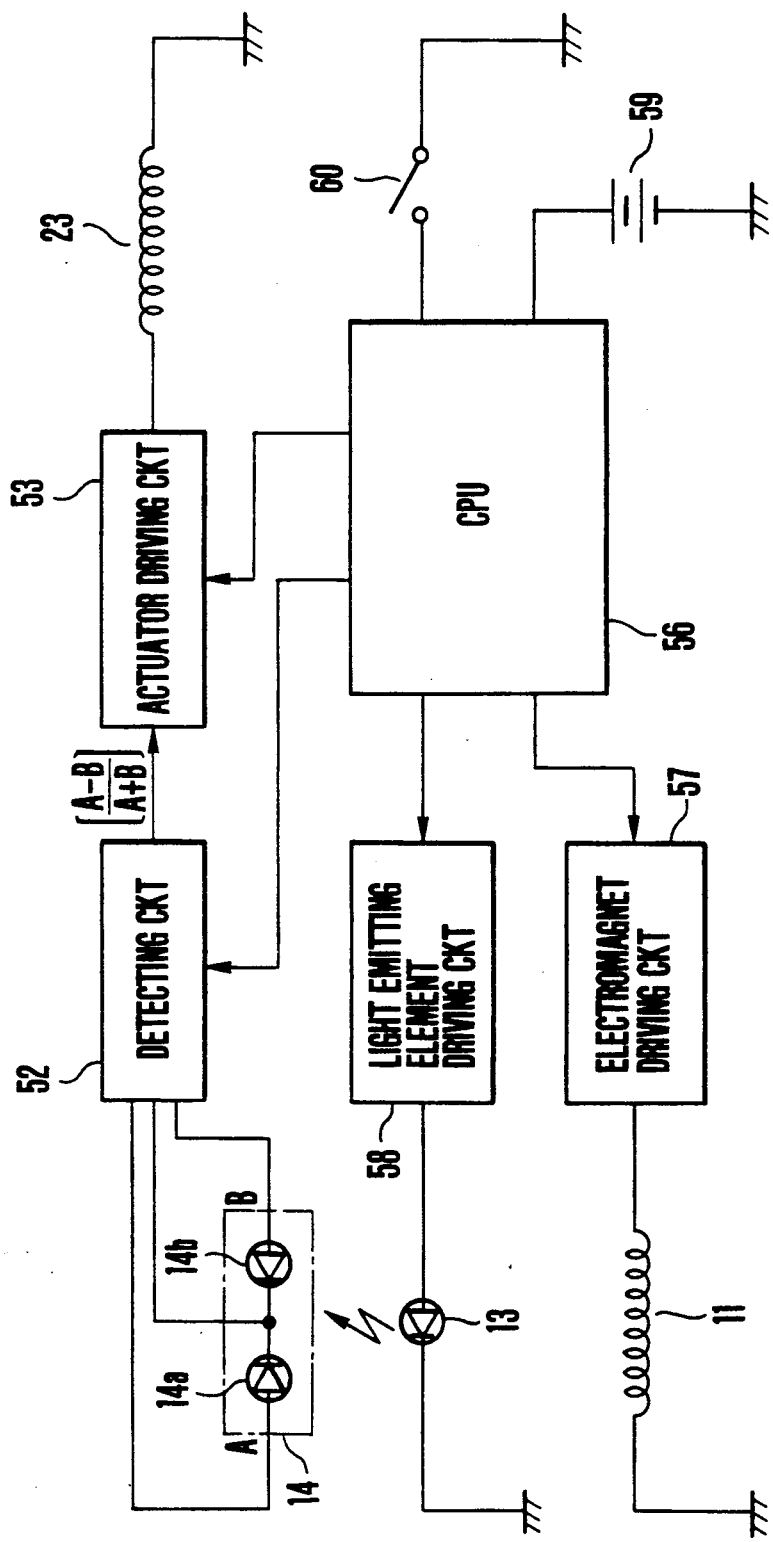
FIG. 4 is a diagram showing in outline the electrical arrangement of the image shake compensating device of the first embodiment.

FIG. 4 shows in outline the electrical control arrangement included in the image shake compensating device of this embodiment. The control arrangement consists of various circuits related to the light emitting elements 13 and the light receiving elements 14 which are disposed within the detectors 31 and 32; circuits for controlling the electromagnets of the floating body positioning devices included in the detectors 31 and 32; circuits for controlling a power supply to the coil of the compensating optical system actuator; a microcomputer (hereinafter referred to as CPU) 56 which is arranged to control the above-stated various circuits.

Referring to FIG. 4, two diodes 14a and 14b form a light receiving element 14. When the light of the light emitting element 13 is received by the light receiving element 14, the diode 14a produces an output voltage A and the other diode 14b an output voltage B according to the incident position of the light. In FIG. 4, the light receiving element 14 is shown as being composed of two diodes as a model. In actuality, however, a known PSD is arranged to produce two outputs A and B indicating the position of the incident light.

A detecting circuit 52 includes an addition-and-subtraction circuit and a division circuit and is arranged to produce a signal indicating $(A-B)/(A+B)$. Further, an output $(A+B)$ of the detecting circuit 52 represents the whole output of the light receiving element 14. Another output $(A-B)$ of the circuit 52 represents the incident position of a light flux incident on the light receiving element 14 and also indicates whether or not the compensating optical system is following the detector.

A light emitting element driving circuit 58 is arranged to control a current flow to the light emitting element 13. An electromagnet driving circuit 57 controls a current flow to the coil of the floating body positioning electromagnet. A start switch 60 is provided for causing an image shake compensating device to operate. An actuator driving circuit 53 is arranged to control a current supply to the coils 23 of the actuators 33 and 34. A reference numeral 56 denotes the CPU which is arranged to control these circuits.

Figure 5:
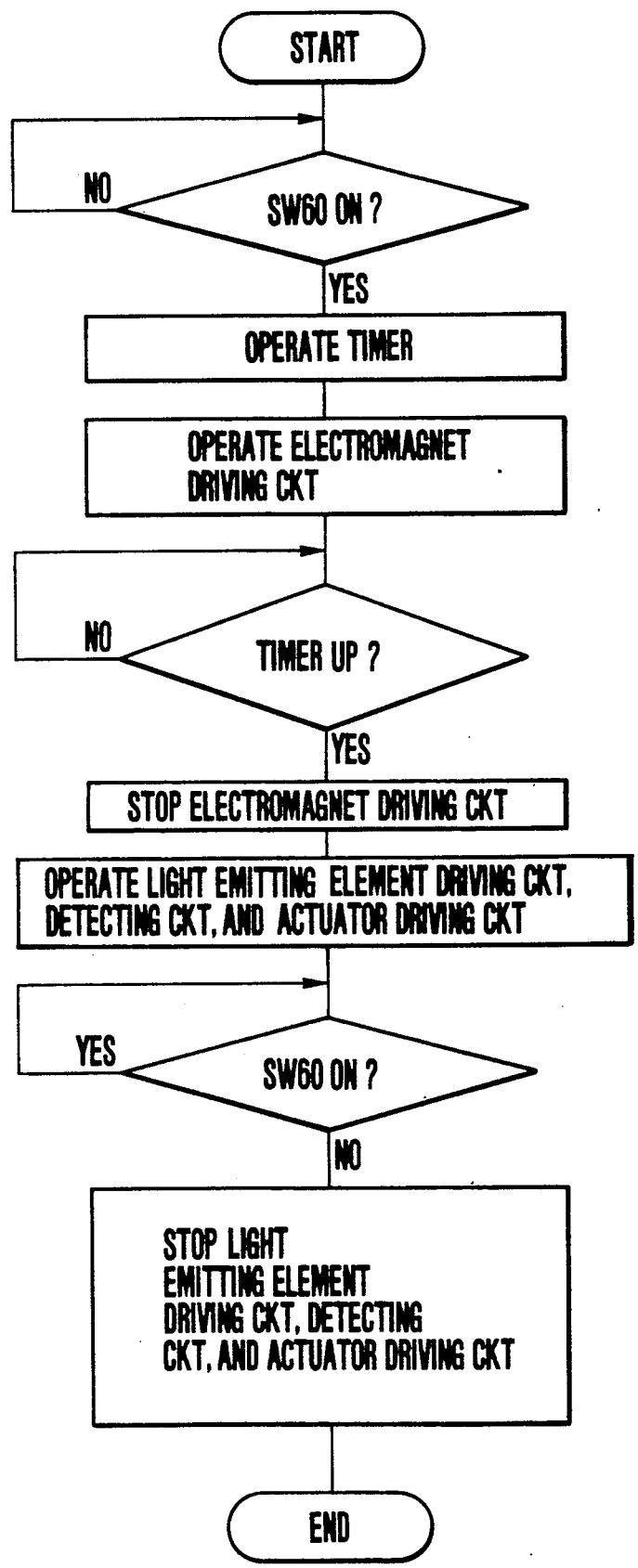
FIG. 5 is a flow chart showing a program to be executed by a CPU 56 included in FIG. 4.
Figure 6A:
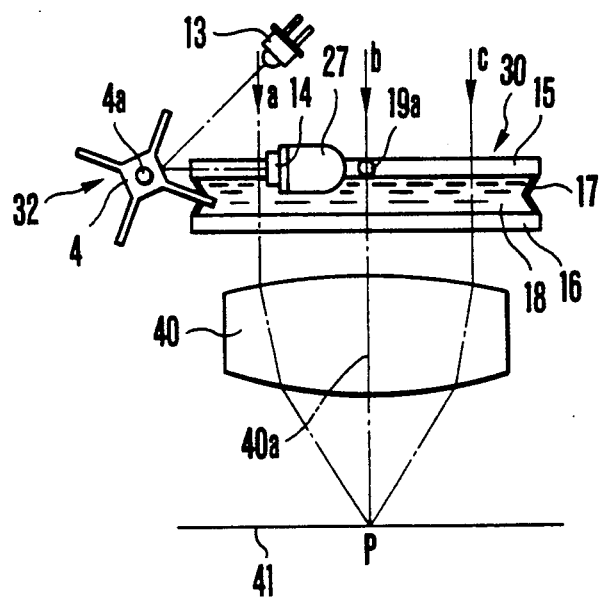
FIG. 6(a) shows the above-stated image shake compensating device as in a non-operating state.
Figure 6B:
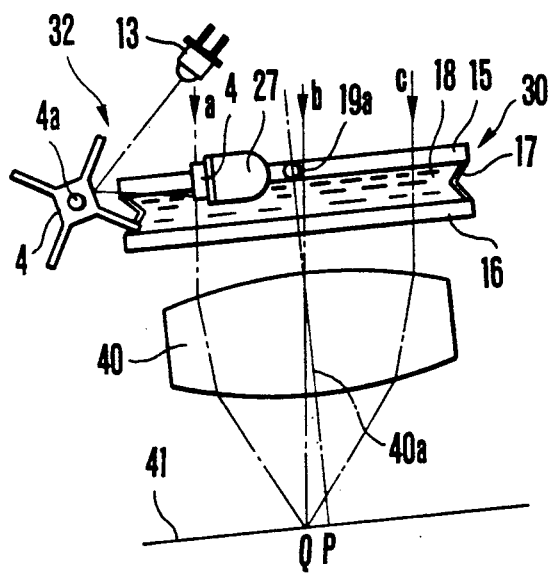
FIG. 6(b) shows an optical instrument equipped with the same image shake compensating device as in a shaking state thus causing an image shake on its image forming plane.
Figure 6C:
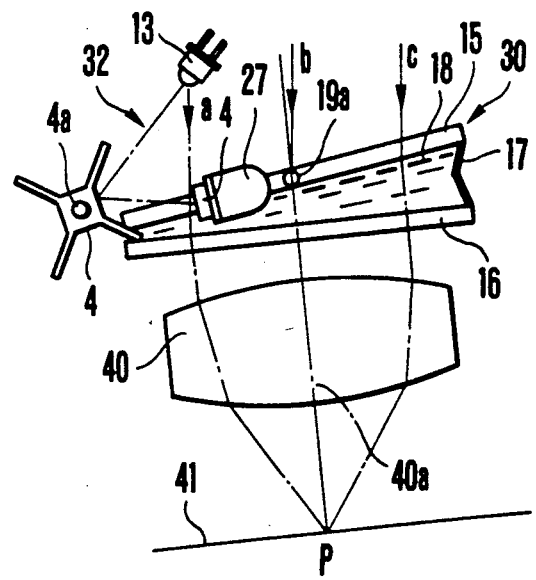
FIG. 6(c) shows the same optical instrument as in a state of having been compensated for the image shake.

FIG. 5 is a flow chart showing a program to be executed by the CPU 56 of FIG. 4. FIGS. 6(a), 6(b) and 6(c) show the various states of the compensating optical system 30 and the detector 32.

The following describes the operation of the image shake compensating device of this embodiment with reference to FIGS. 1 to 6(c). The detector 32 and the compensating optical system 30 are assumed to be in repose in the state of FIG. 6(a) before the image shake compensating device begins to operate.

Referring to FIG. 4, when a switch 60 is closed, the CPU 56 allows a timer which is included therein to operate as shown in FIG. 5. After that the electromagnet driving circuit 57 which is interlocked with the timer begins to operate. This causes a power supply to be effected to the electromagnet coils 11 disposed within the detectors 31 and 32. The power supply to the coils 11 continues until the operation of the timer comes to an end. With the coil thus energized, the yokes 8 and 9 are magnetized. The vane part of the floating body 4 is moved up to a position where it is in alignment with the fore ends of the yokes 8 and 9 and then comes to a stop there as shown in FIG. 2. The detectors 31 and 32 are reset by this. Then, if the optical instrument has not been shaken and swung on its horizontal or vertical axis, the light emitting element 13, the light receiving element 14, the mirror 5 and the variable angle prism device of the compensating optical system within each of the detectors 31 and 32 are respectively in their postures as shown in FIG. 6(a). Further, in FIGS. 6(a) to 6(c), a reference numeral 40 denotes the photo-taking lens of the optical instrument and a numeral 41 the image forming plane of the optical instrument. Parallel pencils of rays "a", "b" and "c" incident on the variable angle prism device form an image at a point P on the optical axis.

After the detectors 31 and 32 are reset as in the manner mentioned above, the CPU 56 causes the light emitting element driving circuit 48 to drive the light emitting element 13 to emit light. At this time, if the optical instrument is not shaking as mentioned above, the relative positions of the light emitting element 13, the mirror 5 and the light receiving element 14 are in the initial states as shown in FIG. 6(a). The compensating optical system is, therefore, not driven.

When the optical instrument deviates (turns round) on the horizontal or vertical axis from the above-stated initial state, the tubular member 2 of the detector 31 or 32 comes to turn round on the axis of the floating body 4. Meanwhile, however, the floating body 4 is kept in its original position by the force of inertia of the liquid 3 in the tubular member 2. As a result, a change takes place in the relative positions of the light emitting element 13 and the mirror 5. This causes a change in the position of the incident pencil of rays coming from the mirror 5 to the light receiving element 14.

FIG. 6(b) shows the above-stated condition. Under this condition, the optical instrument is in a state of having been turned round on the vertical axis thereof (an axis parallel to the pin 19a). Accordingly, both the image forming lens 40 and the image forming plane 41 come to slant. The image on the image forming plane 41 moves from the initial image forming position P to a new position Q to give a so-called image shake. Then, since the incident position of the pencil of rays coming from the mirror 5 to the light receiving element 14 has changed, the light receiving element 14 produces from its two ends the output signals A and B according to the incident position. As a result, the detecting circuit 52 produces an output $(A-B)/(A+B)$. This output signal is supplied to the actuator driving circuit 53. This causes the actuator 33 to be excited. The front frame 19 of the compensating optical system 30 is turned round on the pin 19a to bring about a condition, for example, as shown in FIG. 6(c), the parallel pencils of rays "a", "b" and "c" incident on the variable angle prism are refracted in such a way as to form the image obtained by the photo-taking lens at the point P. The image shake is thus compensated for by this. In this instance, when the front frame 19 of the compensating optical system 30 is turned round on the pin 19a, the light receiving element 14 which is arranged in one unified body with the front frame 19 within the detector 31 also turns round on the pin 19a. Therefore, the incident light coming from the mirror 5 to the light receiving element 14 also changes its position. The output of the detecting circuit 52 decreases accordingly as the turning degree of the front frame 19 increases. The movement of the compensating optical system 30 is mechanically fed back to the detector 32. When the output of the detecting circuit 52 becomes zero (i.e., $|A-B|=0$), the action of the actuator driving circuit 53 comes to a stop. The actuator 33 also stops operating.

Figure 7:
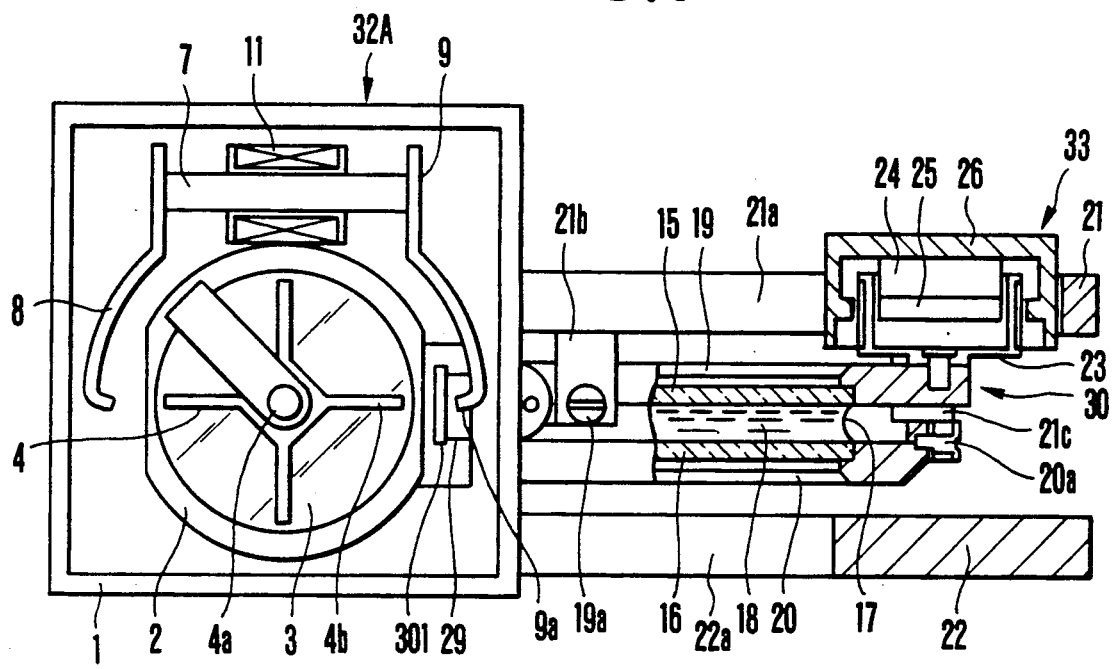
FIG. 7 shows in the same manner as in FIG. 2 an image shake compensating device arranged as a second embodiment of the invention.
Figure 8A:
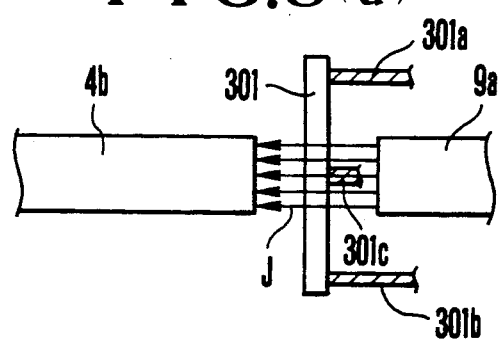
FIGS. 8(a) and 8(b) are enlarged views showing a part of a detector included in the second embodiment.
Figure 8B:
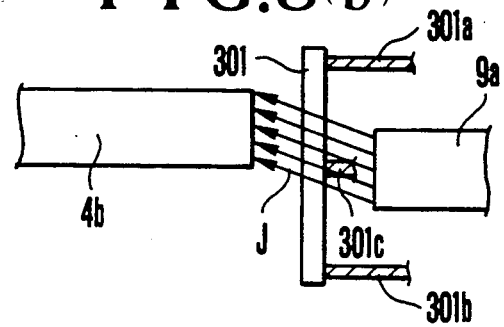

FIGS. 7, 8(a) and 8(b) show a second embodiment of the invention in which the detectors 31 and 32 of the first embodiment described above are modified. In the second embodiment, the compensating optical system is composed of the same variable angle prism device as that of the first embodiment. Therefore, details of the compensating optical system are omitted from description and the component parts of the compensating optical system are indicated by the same reference numerals as those used in FIGS. 1, 2 and 3.

The following description of the second embodiment takes up one of two detectors 32A which are arranged in the same manner as each other but differ from the arrangement of the first embodiment. In FIGS. 7, 8(a) and 8(b), the same component parts as those of the first embodiment are indicated by the same reference numerals. The detector 32A is a hydrostatic sensor like the detectors 31 and 32 of the first embodiment. In the case of the second embodiment, however, the detector 32A differs from the detector of the first embodiment in the following point: Unlike the first embodiment, the detector 32A is not arranged as a photo-electric conversion element for detecting a change in the relative positions of the floating body 4 and the tubular member 2. More specifically, the detector 32A incorporates a semiconductor magnetoresistive element 301 therein.

The semiconductor magnetoresistive element 301 is carried by an element support plate 29 which is disposed between the fore end part 9a of the yoke 9 and the arm 4b of the floating body 4 which is opposed to the fore end part 9a. When the arm 4b of the floating body 4 is in alignment with the fore end part 9a of the yoke 9 as shown in FIGS. 7 and 8(a), there is formed a magnetic circuit in a loop of: yoke 7 - yoke 9 - floating body 4 - yoke 8 - yoke 7. Then, as shown in FIG. 8(a), a magnetic flux J passes the middle part of the semiconductor magnetoresistive element 301. Therefore, the resistance values obtained between the middle terminal 301c of the element 301 and one end terminal 301a and between the middle terminal 301c and the other end terminal 301b become equal to each other. Therefore, the output of the detecting circuit 52 becomes zero. However, when the positions of the floating body 4 and the yoke 9 relative to each other changes, the magnetic flux J comes to deflect from the middle part of the magnetoresistive element 301 toward the terminal 301a as shown in FIG. 8(b). Therefore, the electric resistance between the terminal 301c and the terminal 301a increases while the resistance between the terminals 301c and the terminal 301b decreases. This causes the detecting circuit 52 to product an output.

FIGS. 9 and 10(a) to 10(c) show a third embodiment of this invention. In this case, the compensating optical system of the preceding embodiments is modified by way of example. The third embodiment uses, as the detector, the same hydrostatic sensor of the type incorporating a photo-electric conversion element as in the case of the first embodiment shown in FIGS. 1 to 3. With respect to the detector arrangement, FIGS. 9 and 10(a) to 10(c) indicate the same component parts as those of the first embodiment with the same reference numerals. Meanwhile, the third embodiment employs a cantilever type compensating optical system, instead of the variable angle type prism device of the first embodiment.

Figure 9:
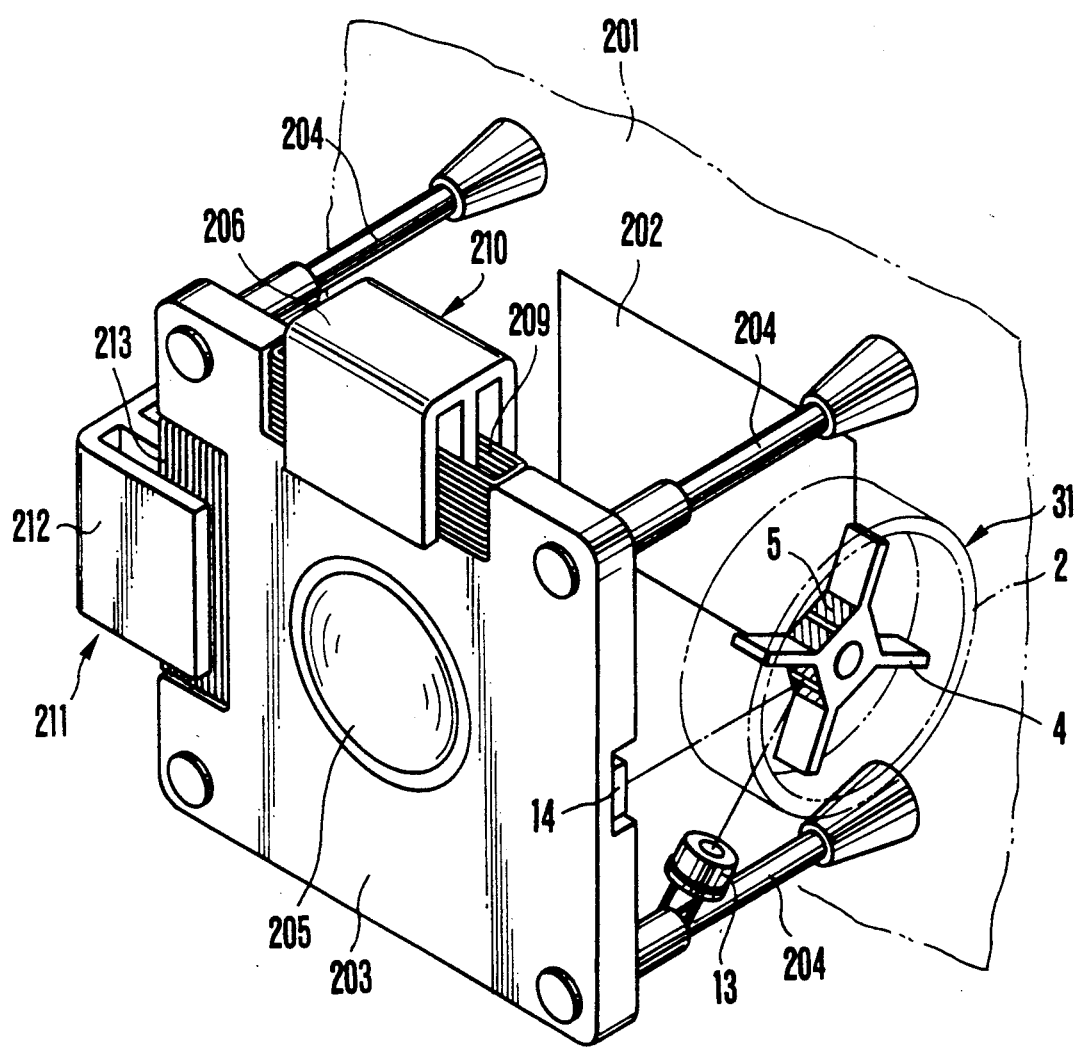
FIG. 9 is an oblique front view showing the essential parts of an image shake compensating device arranged as a third embodiment of the invention.

Referring to FIG. 9, a compensating lens 205 is carried by a flat lens holding frame 203. The lens holding frame 203 is carried in a cantilever-like manner by the fore ends of four flexible support rods 204 which extend in parallel to the optical axis of the lens 205. Each of the flexible support rods 204 has its core made of a metal rod or a metal wire material. The core material is coated with an elastic expandable matter like a rubber material. The rear end of the support rod 204 is secured to a body frame 201 of an optical instrument such as a camera. Since the fore end of each support rod 204 is flexible in the direction perpendicular to the optical axis, the lens holding frame 203 is also movable in the same direction.

Figure 10A:
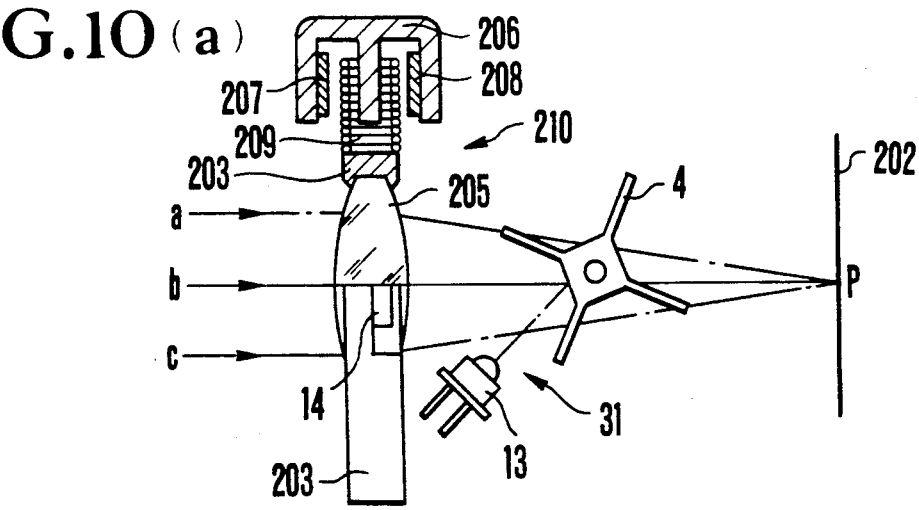
FIGS. 10(a), 10(b) and 10(c) show the third embodiment as in the various states thereof.
Figure 10B:
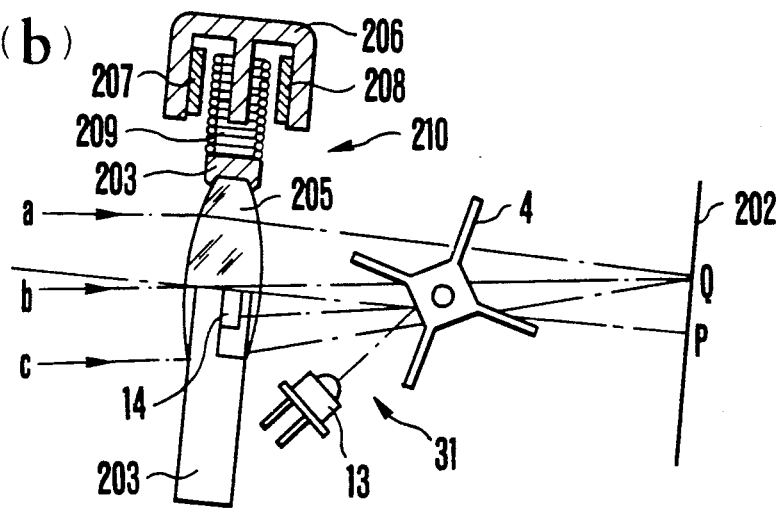
Figure 10C:
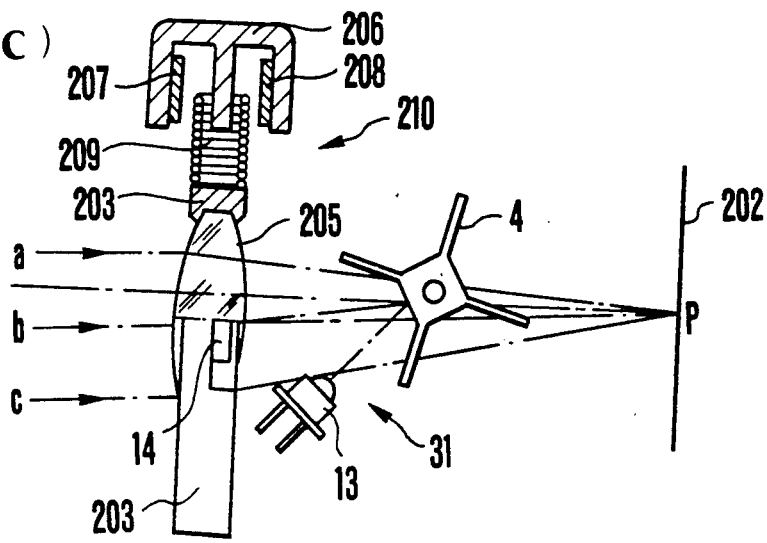

Cut-out parts are formed in two sides of the lens holding frame 203. A coil 213 and a yoke 212 of an actuator 211 for horizontal driving are disposed at one of the cut-out parts. At the other cut-out part are disposed a coil 209 and a yoke 206 of an actuator 210 which is provided for driving in the vertical direction. The coils 213 and 209 of the actuators 211 and 210 are secured to the lens holding frame 203 through reels. The yokes 206 and 212 of these actuators are secured to a stationary structural member of the optical instrument such as the body frame 201 or the like. As shown in FIGS. 9 and 10(a) to 10(c), the cross sections of these yokes are in the shape of the letter E. The yoke 206 consists of a middle piece which is inserted in the coil 209 and outside pieces which extend in parallel along the outside of the coil 209. To the inner walls of the outside pieces are secured permanent magnets 207 and 208 as shown in FIGS. 10(a) to 10(c). Each of the actuators 210 and 211 is composed of the yoke and the permanent magnets and the coil. The actuators are thus arranged to be capable of driving the lens holding frame 203 in the vertical and horizontal directions when the coils 209 and 213 are energized.

The light receiving element 14 which is included in the detector 31 is secured to the back side of the lens holding frame 203. The light receiving element 14 is arranged to receive the reflection light of the mirror 5 which is attached to the floating body 4.

The electrical arrangement of the image shake compensating device of this (the third) embodiment is the same as in the case of the second embodiment shown in FIG. 4 and, therefore, requires no description.

FIGS. 10(a) to 10(c) show the mechanical arrangement of the image shake compensating device of FIG. 9 as in its various states.

FIG. 10(a) shows the device as in a state of having no shaking of the optical instrument. In this state, the image forming plane 202, the lens 205 and the lens holding frame 203 of the optical instrument are in parallel to a vertical plane which is perpendicular to the optical axis of the lens. The pencil of rays coming from the mirror 5 of the floating body 4 to the light receiving element 14 is received at the middle part of the light receiving element 14. Therefore, the outputs A and B of the element 14 which are produced from two ends of the element are equal to each other to give no output of the detecting circuit 52. Parallel rays of light "a" to "c" incident on the lens 205 form an image at the center P of the image forming plane 202 and show no image shake.

FIG. 10(b) shows the device as in a state of having the optical instrument turned round clockwise on the horizontal axis thereof, which is perpendicular to the paper surface of the FIGS. 10. The image forming plane 202, the lens 205 and the lens holding frame 203 are also turned round together with the optical instrument. The parallel rays of light "a" to "c" incident on the lens 205 then form an image at a point Q thus showing an image shake. Under this condition, the floating body 4 within the detector 31 remains in its position of FIG. 10(a). This brings about a change in the relative positions of the mirror 5 and the light receiving element 14. The reflection light from the mirror 5 falls on a point deviating from the center of the light receiving element 14. As a result, the two end outputs A and B of the light receiving element 14 are no longer equal to each other. The detecting circuit 52 then produces an output (A−B)/(A+B). Therefore, the actuator driving circuit 53 drives the actuator 210 by allowing a current corresponding to the output of the detecting circuit 52 to flow to the coil 209 of the actuator 210. When the coil 209 is thus energized, the current of the coil 209 and the magnetic fields of the permanent magnets 207 and 208 interact to exert on the coil 209 a downward force which is parallel to the axis of the coil. Therefore, the lens holding frame 203 is moved downward from the position of FIG. 10(b) perpendicularly to the optical axis of the lens 205. The fore ends of the four flexible carrying rods 204 are then moved downward. The rods 204 elastically warp. The lens 205 and the lens holding frame 203 come down to their positions as shown in FIG. 10(c). Then the image of the parallel pencils of rays "a" to "c" incident on the lens 205 moves from the point Q to another point P. The image is thus compensated for the shake. When the lens 205 and the lens holding frame 203 comes down to the positions of FIG. 10(c), the reflection light from the mirror 5 again falls on the middle part of the light receiving element 14. As a result, the output of the detecting circuit 52 becomes zero. The power supply to the coil 209 of the actuator 210 is cut off. Upon completion of image shake compensation, a shutter mechanism (not shown) is actuated. An exposure to the image forming plane is effected to complete a photographing operation.

Next, a fourth embodiment of this invention is arranged as shown in FIG. 11. In the drawing, the parts of the fourth embodiment which are arranged in the same manner as in the first embodiment are indicated by the same reference numerals and the details of them are omitted from the following description.

In addition to the floating body positioning arrangement of the first embodiment described in the foregoing, the fourth embodiment is arranged to detect from the output of the detector the arrival of the compensating optical system at a limit point within its compensatable range; and to bring the compensating optical system to the middle position of the compensatable range by brining the floating body back to its initial position.

To have the above-stated function added to the floating body positioning arrangement, the electrical control arrangement of the fourth embodiment includes means for changing the amount of power supply to the coil 11 mentioned in the foregoing.

The mask 29 which is disposed in front of the light receiving element 14 is provided with a laterally extending rectangular aperture 29a. The lateral width (i.e., vertical dimension as viewed on FIG. 2) of the aperture 29a of the mask 29 corresponds to the size of the compensatable action range of the compensating optical system. When the compensating optical system is moved up to the limit point of the compensatable action range, the rays of light coming from the mirror 5 to the light receiving element 14 fall upon the light receiving element 14 in a state of brushing one end edge of the aperture 29a of the mask 29. In this instance, a part of the incident light is eclipsed by the edge of the aperture 29a. The amount of light incident on the light receiving element 14 thus decreases. As a result, the output of the light receiving element 14 decreases to indicate that the compensating optical system is in the limit position of the compensatable action range.

FIG. 11 shows in outline the electrical control arrangement of the image shake compensating device which is arranged as the fourth embodiment of the invention. The control arrangement comprises the circuits of varied kinds related to the above-stated light emitting and receiving elements 13 and 14 disposed within each of the detectors 31 and 32; a control circuit for controlling the electromagnet of the floating body positioning/restoring device disposed within each of the detectors 31 and 32; a circuit for controlling a power supply to the coil of the compensating optical system actuator; and a CPU 156 which is arranged to control the various circuits.

Referring to FIG. 11, a detecting circuit 152 is formed by a addition/subtraction circuit. The circuit 152 is arranged to generate signals indicative of values (A−B) and (A+B). The output (A+B) of the detecting circuit 152 represents the whole output of the light receiving element 14. The output (A−B) represents the incident position of a light flux incident on the light receiving element 14 and also indicates whether or not the compensating optical system is following the detector.

A received-light level detecting circuit 61 is formed by a known comparator. The circuit 61 is arranged to compare a reference level KVC set by a reference level setting device 62 with the signal (A+B) coming from the detecting circuit 152. When the level of the input signal (A+B) is lower than the reference level KVC, the received-light level detecting circuit 61 produces an output and supplies it to a light emitting element driving circuit 158. The light emitting element driving circuit 158 is arranged to increase the quantity of current supplied to the light emitting element 13 in accordance with the output of the detecting circuit 152. An emitted-light level detecting circuit 63 is arranged to detect the amount of a current flowing from the light emitting element driving circuit 158 to the light emitting element 13 and to produce an output which corresponds to the detection value thus obtained. A determination circuit 64 is arranged to produce an output which indicates a difference between the output of the emitted-light level detecting circuit 63 and a level stored at an emitted-light level storing circuit 65 and to determine the state of the compensating optical system and that of the detector. The above-stated emitted-light level storing circuit 65 is arranged such that, when the variable angle prism device is located in the middle position of the compensatable action range so that the received-light detecting circuit 61 detects that the input signal (A+B) reaches the reference level KVC, the circuit 65 stores the output of the emitted-light level detecting circuit 63 produced at that time in response to a control signal m output from the CPU 156. A start switch 60 is arranged to cause the image shake compensating device to begin to operate and to serve also as a power supply switch for the optical instrument or as a function switch.

The above-stated detector and the circuit group consisting of the emitted-light level detecting circuit 63, the emitted-light level storing circuit 65, the determination circuit 64 and the electromagnet driving circuit 57 jointly form floating body positioning control means for repositioning the compensating optical system by controlling the restoring action of the detector when a large shake exceeding the compensatable range of the compensating optical system or some unusual vibrations are inflicted upon the optical instrument. Further, in combination with this floating body positioning control means, the detecting circuit 152 and the actuator driving circuit 53 jointly form main control means for the above-stated actuator.

FIG. 12 is a flow chart showing a program to be executed by the CPU 156 of FIG. 11. Further, the mechanical arrangement of the image shake compensating device of the fourth embodiment is identical with that of the first embodiment. Referring to FIGS. 1 to 3, 6, 11 and 12, therefore, the image shake compensating device of the fourth embodiment is described as follows:

When the switch 60 of FIG. 11 is closed, the CPU 156 causes a timer 1 which is included in the CPU 156 to operate as shown in FIG. 12. Following that, the electromagnet driving circuit 57 which is interlocked to the timer 1 is rendered operative. This causes a power supply to be supplied to the coil 11 of the electromagnet disposed within each of the detectors 31 and 32. With the coil 11 thus energized, the yokes 8 and 9 are magnetized. Therefore, the vane part of the floating body 4 is moved to a position where it is in alignment with the fore ends of the yokes 8 and 9 and is then brought to a stop in this position as shown in FIG. 2. By this, the detectors 31 and 32 are reset. If the optical instrument is not shaken on its horizontal or vertical axis at that time, the light emitting element 13 and the light receiving element 14 which are disposed within each of the detectors 31 and 32 and the variable angle prism device of the compensating optical system are respectively in their postures as shown in FIG. 6(a).

After the detectors 31 and 32 are reset as mentioned above, the CPU 156 causes the light emitting element driving circuit 158 to drive the light emitting element 13 to emit light, and brings the detecting circuit 52 and the actuator driving circuit 53 into an operable state. At that moment, if the optical instrument is not shaking as mentioned above, the relative positions of the light emitting element 13, the mirror 5 and the light receiving element 14 are in their initial states as shown in FIG. 6(a). Therefore, the level of the output (A−B) of the detecting circuit 152 is zero, and the actuator driving circuit 53 does not supply a current to the coil 23, so that the compensating optical system is not driven.

When the optical instrument is shaken or turned round on its horizontal or vertical axis, the tubular member 2 of either the detector 31 or the detector 32 is turned round on the axis of the floating body 4 along with the optical instrument. However, the floating body 4 is retained in its original position by the force of inertia of the liquid 3 provided within the tubular member 2. As a result, a change occurs in the relative positions of the light emitting element 13 and the mirror 5. A light flux coming from the mirror 5 to the light receiving element 14 also changes its incident position accordingly.

This condition is as shown in FIG. 6(b). The optical instrument is in a state of having been turned round on the vertical axis, which is in parallel to the pin 19a. Accordingly, the image forming lens 40 and the image forming plane 41 also slant. An image formed on the image forming plane 41 moves from the initial image forming position P to another position Q to bring about the so-called image shake.

With the optical instrument shaken as shown in FIG. 6(b), the change in the positional relation between the mirror 5 and the light receiving element 14 causes the output (A−B) of the detecting circuit 152 to be no longer zero. The actuator driving circuit 53 is driven according to the output (A−B) of the detecting circuit 152. Then, a current is supplied to the coil 23 of the actuator 33, so that the actuator 33 is driven.

With the actuator 33 driven, the front frame 19 of the compensating optical system 30 is turned round on the pin 19a. The light receiving element 14 which is in one body with the front frame 19 is also turned round on the same pin 19a. The positional relation between the mirror 5 and the light receiving element 14 changes from the state of FIG. 6(b) toward the state of FIG. 6(c). The shake detection output (A−B) of the detector 32 comes to decrease accordingly as the turning degree of the front from 19 increases. The input to the actuator driving circuit 53 also decreases accordingly as the front frame 19 turns round. The acting degree of the compensating optical system is mechanically fed back to the actuator driving signal.

Assuming that the reflection light of the mirror 5 falls on the middle part of the light receiving element 14 when the front frame 19 of the compensating optical system 30 is turned round to the position of FIG. 6(c), the driving action on the actuator 33 comes to a stop as the output (A−B) from the detecting circuit 152 then becomes zero. This brings the turning movement of the front frame 19 to a stop. At this instance, the image of the parallel pencils of rays "a" to "c" incident on the image forming plane 41 is formed at the point P to have the image thus compensated for the image shake.

Generally, an optical instrument such as a camera or the like equipped with an image shake compensating device tends to become incapable of compensating for an image shake under the following conditions:

(a) a shake of the camera with amplitude exceeding the compensatable range of the compensating optical system; and (b) in case that the camera at first shakes with a small degree of amplitude near the middle point of the compensatable range of the compensating optical system before it deflects to a great degree and, after that, it shakes with small amplitude in the deflected position.

In the case of the shake (a), the compensating optical system correctly acts within the compensatable range but becomes completely incapable of compensating the instant the shake comes to exceed this range. Considering the camera shake in terms of an image shake occurring on the image forming plane, an image which has been kept in repose by the compensating action suddenly comes to deflect to a great extent at a point of time. Therefore, the compensating action rather gives an adverse effect of enlarging the image shake. Besides, the sudden image shake is disagreeable to the visual sensations when the image shake compensating device is mounted on a video camera, a binocular or the like.

Meanwhile, in the case (b) above, the position of the compensating optical system is biased to one side of the compensatable range after the great deflection of the camera. The biased position then prevents the compensating optical system from moving if the camera is further deflected to a great degree next time. Therefore, the image shake compensating action cannot be adequately accomplished under this condition. Besides, in this instance, the compensating optical system driving actuator is continuously energized while the optical system is hardly movable. This wastes the electric energy to cause an increased consumption of the battery or the like.

To avoid the enlargement of the image shake or the total inability of the compensating optical system in the case (a) or (b) described above, the image shake compensating device is preferably arranged as follows: Against the case (a), to avoid occurrence of a sudden image shake, the compensating optical system is controlled to lower its compensating speed accordingly as the optical system comes closer to the limit point of the compensatable range. Against the case (b), to enable the compensating optical system to perform the compensating action, the optical system is arranged to be slowly brought back to the middle point of the compensatable range after the first occurrence of the large deflection, so that the optical system can be prepared against a next occurrence of a large deflection.

In the case of the image shake compensating device of the fourth embodiment, the compensating optical system is arranged, against the above-stated case (b), to be brought back to its initial position by the floating body positioning control means described in the foregoing when the optical system is in a position near to the limit point of the compensatable range thereof.

Figure 13:
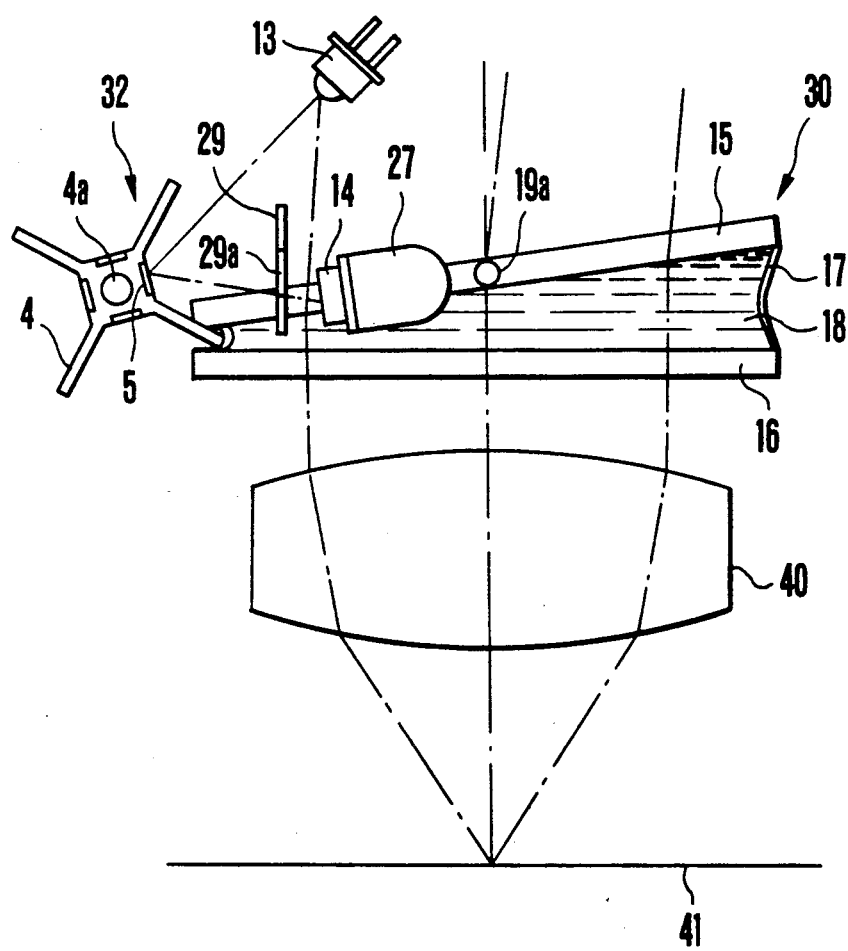
FIG. 13 shows a compensating optical system as in its compensatable limit position.

In other words, when the compensating optical system is close to one of the limits of the compensatable range, for example, as shown in FIG. 13, the floating body 4 is slowly moved back to its initial position, as shown in FIG. 2, by the actions of the determination circuit 64 and the electromagnet driving circuit 57, in a manner as will be described later. With the floating body thus moved back to its initial position, the compensating optical system is ready for a next action. The image shake compensating action, therefore, always can be accomplished even in the case (b) mentioned above.

For this purpose, the fourth embodiment is arranged to determine, from a change in the output of the light emitting element or from the output of the light receiving element, the position of the compensating optical system (to find whether or not it is close to the limit of the compensable range). The compensating optical system is controlled in the above-stated manner on the basis of the result of the determination. This enables the embodiment to perform image shake compensation even when complex vibrations are inflicted upon the optical instrument.

More specifically, as has been described above, when the received-light level detecting circuit 61 detects that the output (A+B) of the detecting circuit 152 reaches the reference level KVC after the light emitting element driving circuit 158 starts the driving, the CPU 156 judges that the amount of light received by the light receiving element 14 reaches the reference value. Further, when the output (A−B) of the detecting circuit 152 is below the prescribed level, the CPU 156 judges that light emitted from the light emitting element 13 enters almost the central portion of the light receiving element 14 and the detectors 31 and 32 are reset to the initial position, and causes the output of the emitted-level detecting circuit 63 to be stored in the emitted-light level storing circuit 65.

On the other hand, during that period, the image shake compensating device is operating in such a manner as described above. The operation of the image shake compensating device continues until the switch 60 is turned off. However, when the compensating optical system reaches the limit position of the compensatable range as shown in FIG. 13, a light flux coming from the mirror 5 to the light receiving element 14 passes through the aperture 29a of the mask 29 by brushing the edge of the aperture 29a. Therefore, a part of the light flux is eclipsed by the edge of the aperture 29a. The quantity of light incident upon the light receiving element 14 thus decreases and, accordingly, the output (A+B) of the detecting circuit 152 also decreases. Since the amount of the input to the received-light level detecting circuit 61 decreases, if the input to the circuit 61 thus becomes less than the reference level KVC, the circuit 61 produces an output for the light emitting element driving circuit 158. In response to this, a driving current applied to the light emitting element 13 is increased. Then, the emitted-light level detecting circuit 63 supplies the light emitting element driving current obtained at that time to the above-stated determination circuit 64. The determination circuit 64 compares the currently detected value of the light emitting element driving current with the previous value of the light emitting element driving current obtained at the above-stated initial position and stored by the emitted-light level storing circuit. The circuit 64 thus determines the current position of the detector (i.e., the positional relation between the light receiving element 14, the light emitting element 13 and the mirror 5) and the position of the compensating optical system 30 from the result of comparison. The determination circuit 64 is thus arranged to produce an output when the compensating optical system is located near the limit of the compensatable range and also when the position of the compensating optical system is located outside the range. The circuit 64 produces no output in all other cases.

When the output of the circuit 64 is produced, the CPU 156 causes the built-in timer 2 and the electromagnet driving circuit 57 to operate. The electromagnet driving circuit 57 increases the current supply to the coil 11 of the electromagnet according to the output of the circuit 64. This causes the vane part of the floating body 4 to be attracted and pulled to the position of the fore ends of the yokes 8 and 9. As a result, the detector 32 is reset to bring the compensating optical system back to its middle position. The electromagnet driving circuit 57 continues the power supply to the coil 11 until the counting operation of the timer 2 comes to an end.

Figure 15:
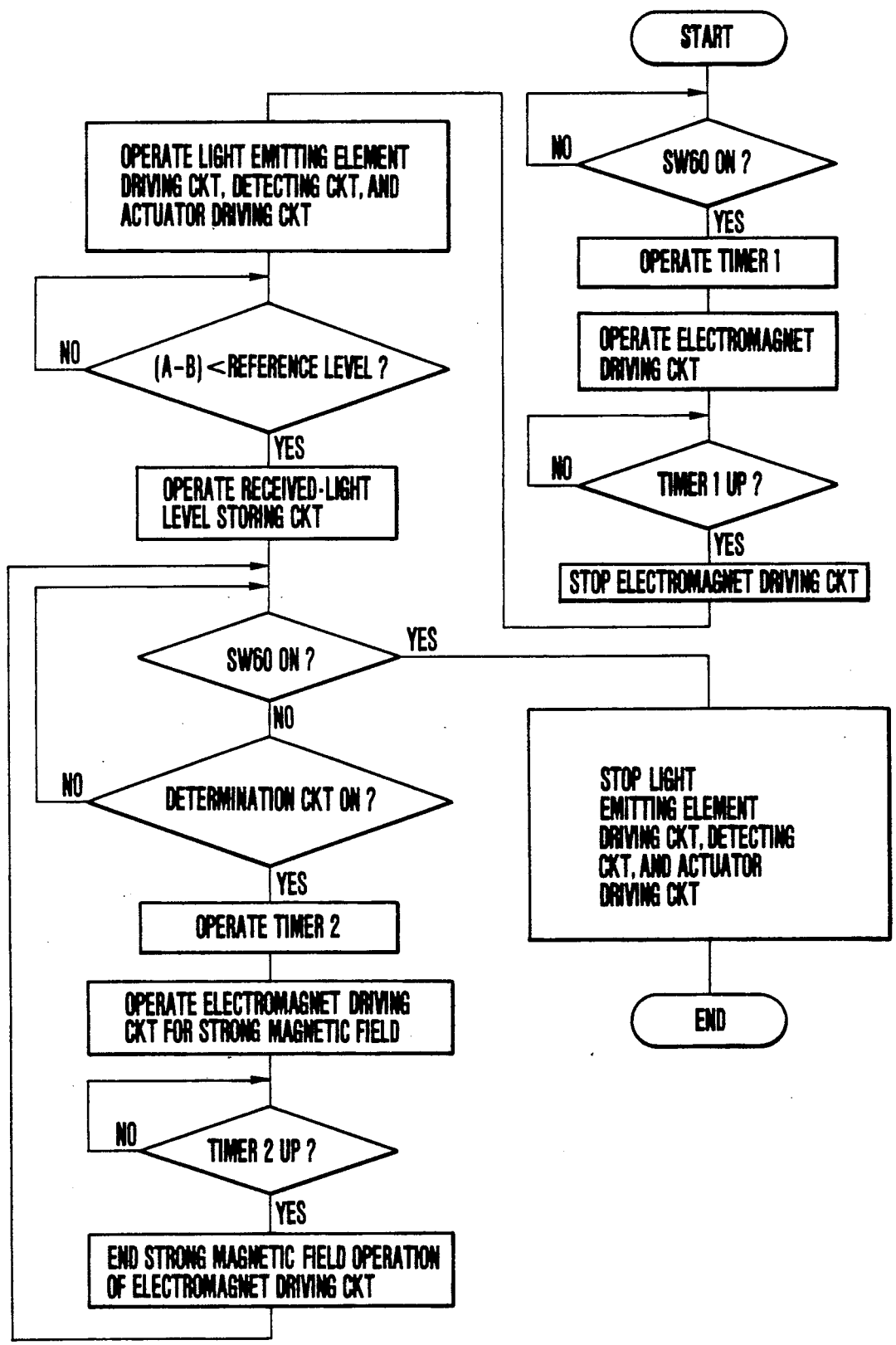
FIG. 15 is a flow chart showing the control operation to be executed by the electrical arrangement of FIG. 14.

FIGS. 14 and 15 show in a diagram and a flow chart the electrical arrangement and the control program of an image shake compensating device arranged as a fifth embodiment of the invention. The mechanical arrangement of the image shake compensating device is identical with that of the first embodiment and, therefore, is omitted from the illustration. Referring to FIG. 14, the illustration includes a CPU 120; a light emitting element driving circuit 121; a detecting circuit 122 which is arranged to receive the output signals A and B of the light receiving element 14 and to produce outputs (A−B) and (A+B); a received-light level storing circuit 123; a determination circuit 124 which is arranged and functions in the same manner as the determination circuit 64 of the fourth embodiment shown in FIG. 11; and a division circuit 125 which is arranged to receive the output of the detecting circuit 122 and to produce an output (A−B)/(A+B). Circuit elements indicated by the same reference numerals as in FIG. 11 are identical with those of the fourth embodiment. Other circuits elements that are labelled the same as but indicated by different reference numerals from FIG. 11 as mentioned above are also arranged to do about the same functions as the corresponding elements shown in FIG. 11. Namely, the light emitting element driving circuit 121 is arranged to cause a given current to flow to the light emitting element 13. The received-light level storing circuit 123 is arranged to store the received light level output (A+B) in response to a signal from the CPU 120 when the output (A−B) of the detecting circuit 122 becomes less than a prescribed level (i.e., a level obtained when a slit image is located in the middle part of the light receiving element 14). The determination circuit 124 is arranged to compare the output (A+B) of the detecting circuit 122 with the level stored by the received-light level storing circuit 123 and to supply an output to the electromagnet driving circuit 57 when the current output (A+B) is lower than the stored level by a given value.

The fifth embodiment differs from the fourth embodiment shown in FIG. 11 in that the data input to the determination circuit 124 is obtained from a circuit which is related to the light receiving element. Meanwhile, the light emission intensity of the light emitting element 13 is arranged to be kept unvarying by the light emitting element driving circuit 57. The arrangement of the fifth embodiment is such that: With the compensating optical system 30 in a position near to the limit of its compensatable range as shown in FIG. 13, when a part of the light flux coming from the mirror 5 to the light receiving element 14 is eclipsed by the edge of the aperture 29a of the mask 29 and, as a result, the total output (A+B) of the light receiving element 14 decreases, if the difference between the level of the output (A+B) and the level stored at the received-light level storing circuit 123 is less than the above-stated given value, the determination circuit 124 produces an output. The output then causes the current supply to the coil 11 to be increased by the electromagnet driving circuit 57.

FIG. 15 is a flow chart showing the operation of the fifth embodiment. Since the flow of operation is about the same as in the case of the fourth embodiment shown in FIG. 12, the description of the flow is omitted.

Figure 16:
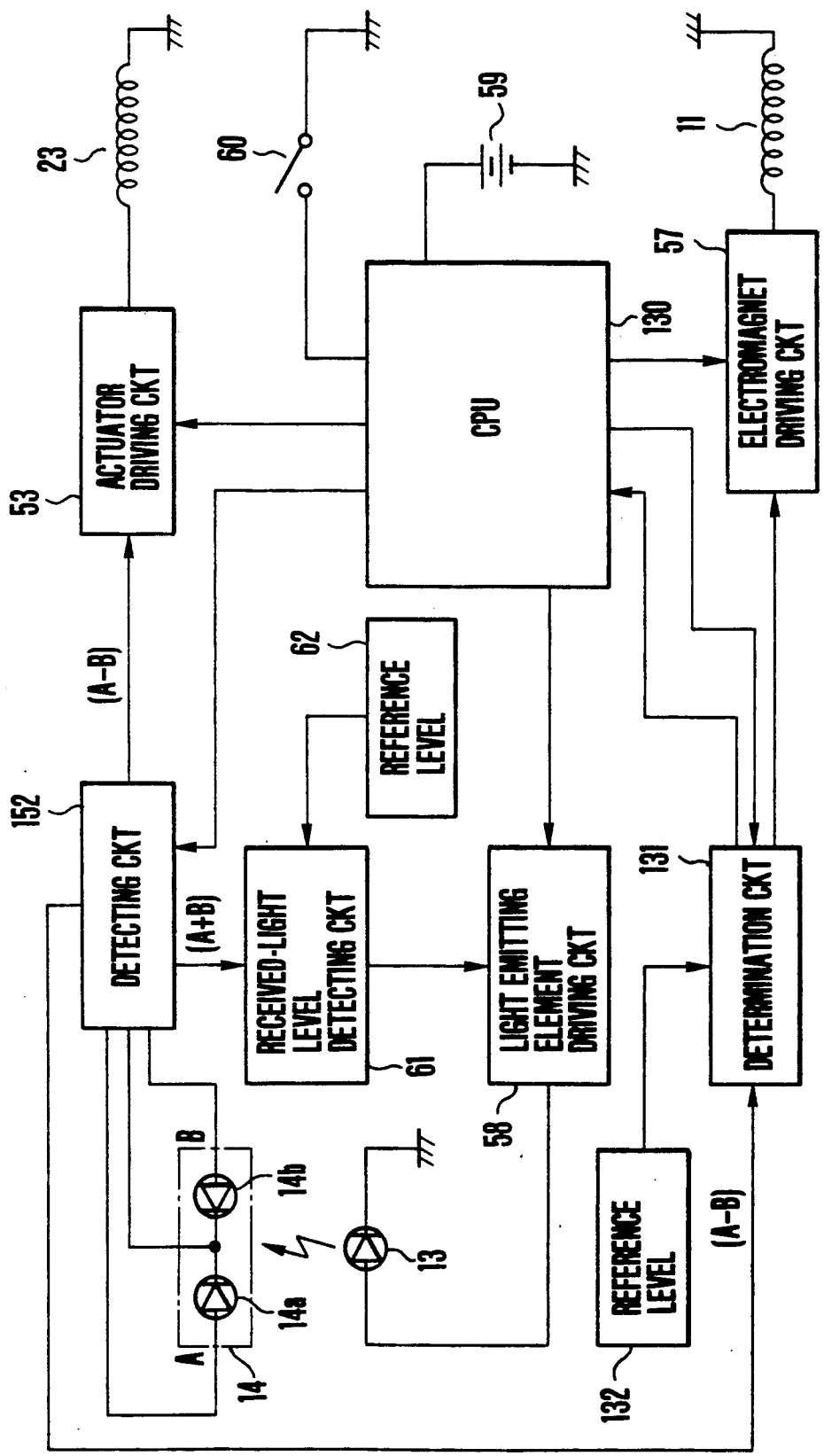
FIG. 16 shows the electrical arrangement of an image shake compensating device which is arranged according to this invention as a sixth embodiment thereof.
Figure 17:
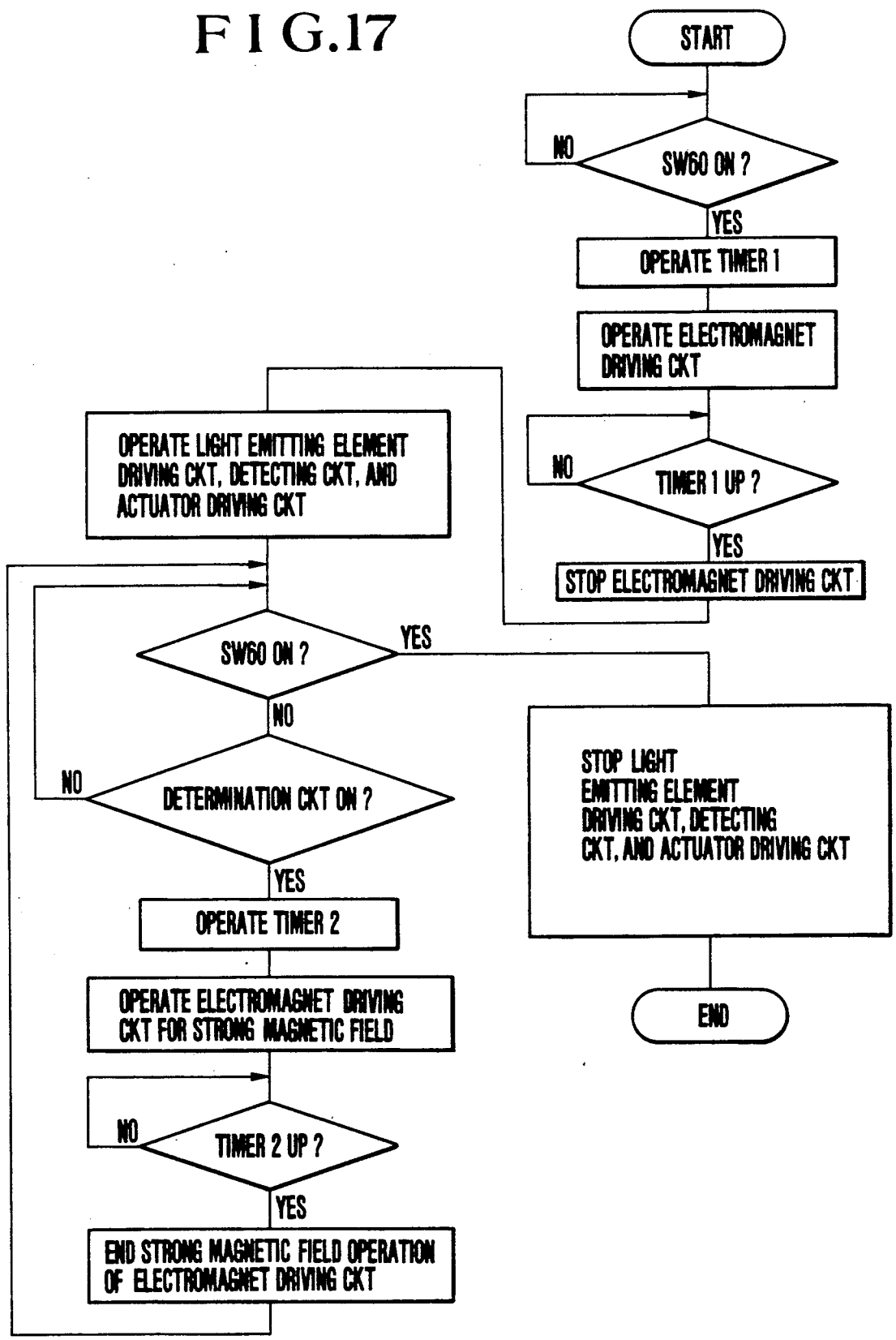
FIG. 17 is a flow chart showing the control operation to be executed by the electrical arrangement of FIG. 16.

FIG. 16 shows the electrical arrangement of an image shake compensating device which is arranged as a sixth embodiment of the invention. FIG. 17 is a flow chart showing the control operation to be carried out by the arrangement of FIG. 16. In FIG. 16, circuit elements indicated by the same reference numerals are arranged in the same manner as the corresponding elements of FIG. 11 and, therefore, the details of them are omitted from the following description:

In the case of the sixth embodiment, the input to the determination circuit 131 is arranged to be the output (A−B) of the detecting circuit 152. Further, unlike the fourth and fifth embodiments (FIGS. 11 and 14), the determination circuit 131 is arranged such that: A reference signal which is to be compared with the output (A−B) of the detecting circuit 152 is set by a reference level setting device 132 which has no relation to the light emitting and receiving elements.

The fourth and fifth embodiment are arranged to control the compensating optical system and the light receiving element in such a way as to have the light flux which is generated by the light emitting element 13 fall on the middle part of the light receiving element 14, that is, to make the output |A−B| of the detection circuit 152 zero. In actuality, however, a delay in the control system tends to require an excessively long period of time before completion of the control operation for |A−B|=0. To solve this problem, the control system is preferably arranged to control the movements of the compensating optical system and the light receiving element in such a way as to obtain a state of |A−B|=α. The feedback gain of the control system is set in such a way as to have the value α within the allowable value range of the image shake on the image forming plane. The control operation can be speeded up by such arrangement.

The sixth embodiment is arranged on the above-stated concept. The reference level to be set by the reference level setting device 132 as a reference signal for the determination circuit 131 is at the above-stated value α. Further, another reference level which is set by a reference level setting device 62 as a reference signal for the received-light level detecting circuit 61 is set irrelatively to the value α.

In the normal operation of the sixth embodiment, the output |A−B| of the detecting circuit 152 never comes to exceed the value α. However, in case that the compensating optical system 30 is driven to move to the limit point of the compensatable range thereof as shown in FIG. 13, the output |A−B| exceeds the value α. In that instance, the determination circuit 131 comes to produce an output to cause the electromagnet driving circuit 57 to increase the current supply to the coil 11 of the electromagnet. Further, as apparent from FIG. 17 which shows the control operation of the sixth embodiment, the control operation of the sixth embodiment closely resembles those of the fourth and fifth embodiments and is, therefore, omitted from description.

Next, a seventh embodiment of the invention is described below with reference to FIGS. 18, 19 and 20:

In these figures, the parts arranged in the same manner as those of the first embodiment are indicated by the same reference numerals and are described in a simplified manner to avoid duplicated description. In addition to the functions of floating body positioning arrangement of the first embodiment described in the foregoing, the floating body positioning arrangement of the seventh embodiment is arranged such that, when the compensating optical system is driven with a shake of the optical instrument detected by the detector 31 or 32, the speed at which the floating body is moved in the direction of decreasing the output of the detector is changed according to the amount of the output of the detector. The speed is changed in such a way as to cause the speed of the compensating optical system to be adjusted according to its position within the compensable range.

Figure 18:
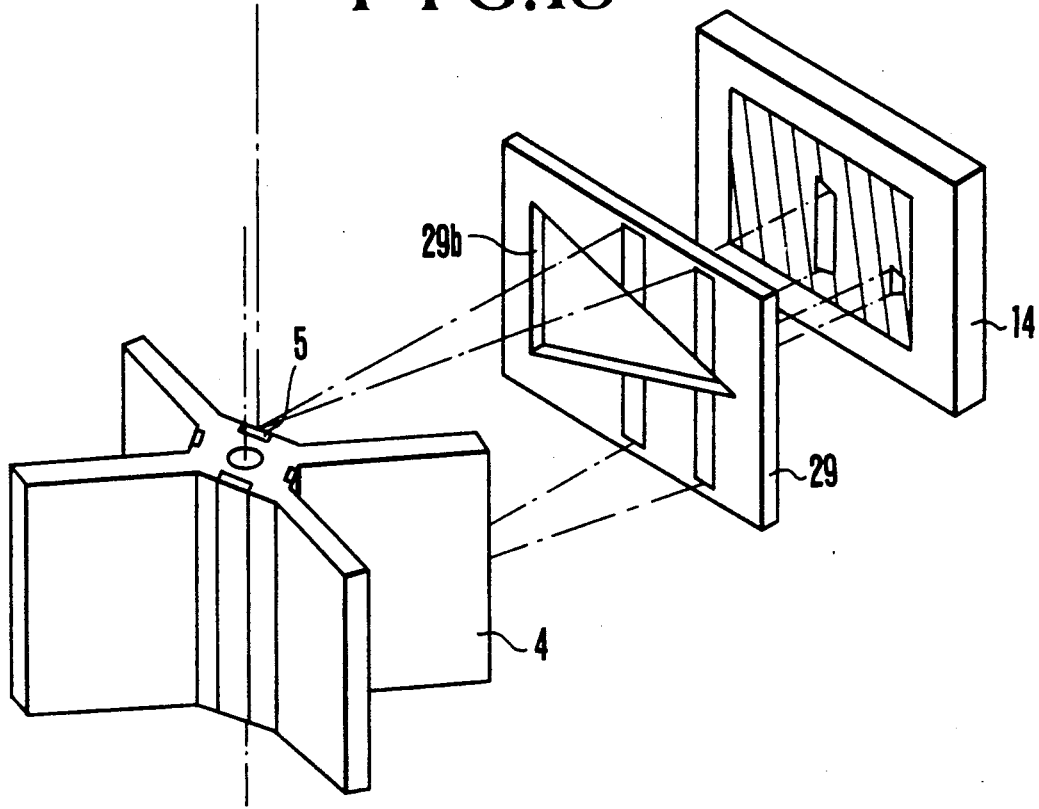
FIG. 18 is an enlarged oblique view showing a floating body 4, a mirror 5, a mask 29 and a light receiving element 14 which are disposed within each of detectors 31 and 32 of a seventh embodiment of the invention.

To give the above-stated additional function to the floating body positioning arrangement, means for changing the amount of power supply to the above-stated coil 11 is included in the electrical control arrangement as will be described later:

Meanwhile, the mask 29 which is disposed in front of the light receiving element 14 is provided with a triangular aperture 29b as shown in FIG. 18. The aperture 29b of the mask 29 is provided for the purpose of adjusting the amount of the output of each of the detectors 31 and 32 to each position of the compensating optical system within the compensatable range. The width of the aperture 29b corresponds to the compensatable range of the compensating optical system. The quantity of light incident upon the light receiving element 14 varies according to the position at which the light incident on the light receiving element passes through the aperture 29b. The amount of the output of the light receiving element 14 varies accordingly. In the case of the mask 29 shown in FIG. 18, a point of the aperture 29b having the largest vertical dimension of the aperture corresponds to one of the limit points of the compensatable action range of the compensating optical system. Another point at which the vertical dimension is zero corresponds to the other limit points of the compensatable range. Therefore, when the light flux coming from the mirror 5 to the mask 29 falls on a position where it is blocked from passing through the aperture 29b, the light receiving element produces no output. In this instance, the shake of the optical instrument is not compensatable by the compensating optical system.

The circuit arrangement of this (the seventh) embodiment as a whole is the same as FIG. 11 which has been described in the foregoing.

Figure 19:
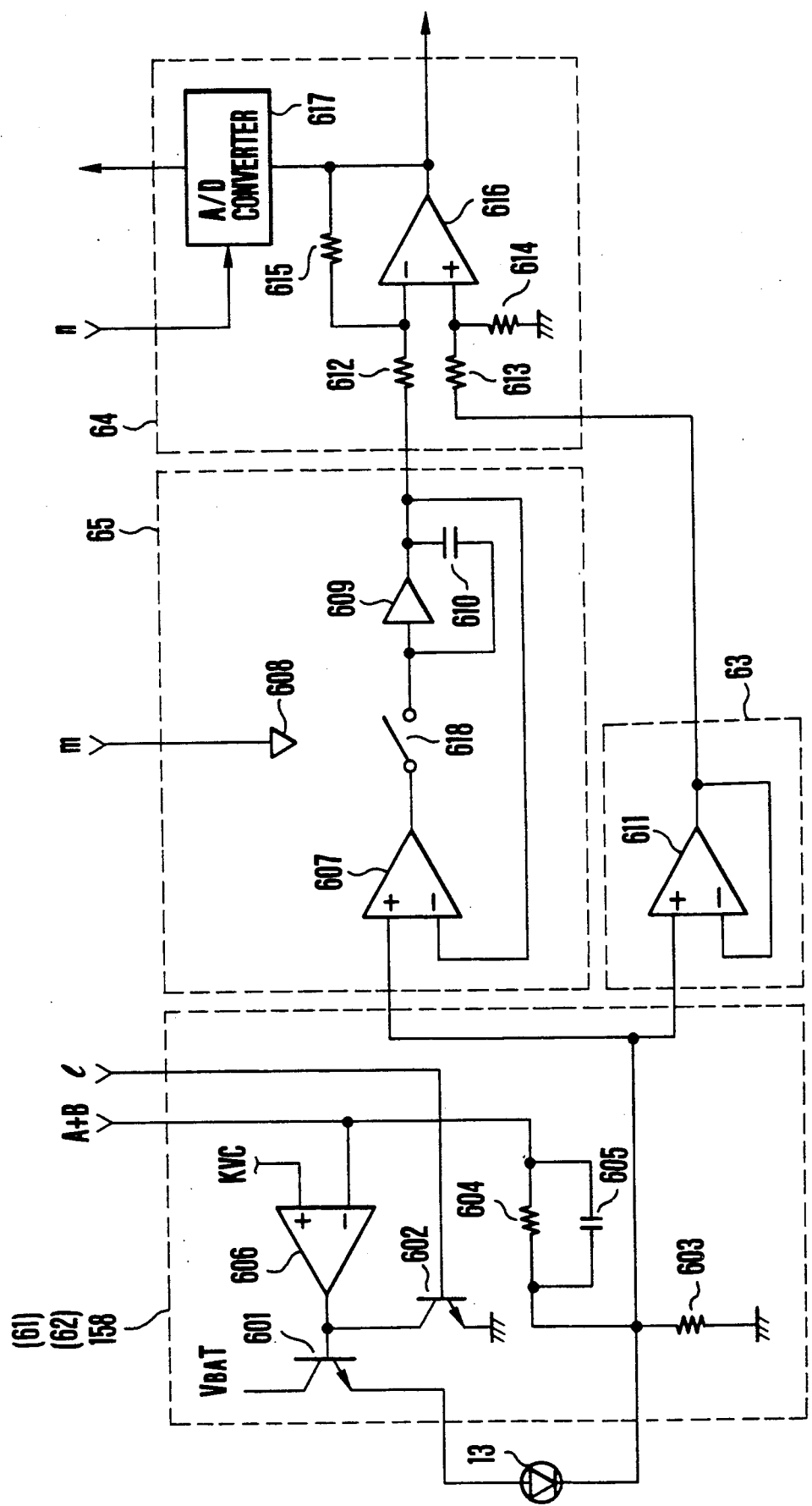
FIG. 19 is a circuit diagram showing by way of example the arrangement of auxiliary control means of the seventh embodiment including light emitting element driving circuit 158, an emitted-light level detecting circuit 63, an emitted-light level storing circuit 65 and a determination circuit 64.

FIG. 19 shows by way of example the arrangement of the light emitting element driving circuit 158, the emitted-light level detecting circuit 63, the determination circuit 64 for determining the state of the detector and the emitted-light level storing circuit 65 of the image shake compensating device of the seventh embodiment. However, the image shake compensating device is not limited to the circuit arrangement of FIG. 19.

Referring to FIG. 19, a transistor 601 is arranged to drive the light emitting element 13 (iRED). A transistor 602 is arranged to permit or prohibit the light emission of the light emitting element in response to a control signal 1 output from the CPU 156. A current detecting resistor 603 is arranged to detect a light emission current equivalent to the amount of light emission by the light emitting element 13. A resistor 604 and a capacitor 605 jointly form a filter arranged to ensure increased safety in controlling the current of the light emitting element 13 to be constant. An operational amplifier 606 is arranged to constantly drive a current corresponding to the output (A+B) of the light emitting element 13. These elements jointly form the light emitting element driving circuit 158 including the received-light level detecting circuit 61. A reference numeral 607 denotes an operational amplifier. A buffer 608 is arranged to turn on and off an analog switch 618 according to a control signal "m" output from the CPU 156. A buffer 609 is arranged to allow a sample-and-holding (storing) capacitor 610 to store an input to the operational amplifier 607 obtained while the analog switch 618 is on. These elements jointly form a storing circuit which is arranged to store the value of the light emitting element current obtained during a given period of time.

An operational amplifier 611 is connected to the light emitting element current detecting resistor 603 and is arranged to produce a voltage value corresponding to the light emitting element current. The amplifier 611 forms the emitted-light level detecting circuit 63.

An operational amplifier 616 forms a subtraction circuit in conjunction with resistors 612 to 615. The subtraction circuit is arranged to produce a difference between the signal output from the emitted-light level storing circuit 65 and the signal output from the emitted-light level detecting circuit 63. An A/D converter 617 is arranged to convert an analog value into a digital value when the output of the subtraction circuit is sent to the CPU. These circuit elements 612 to 617 jointly form the determination circuit 64 mentioned in the foregoing.

Figure 20:
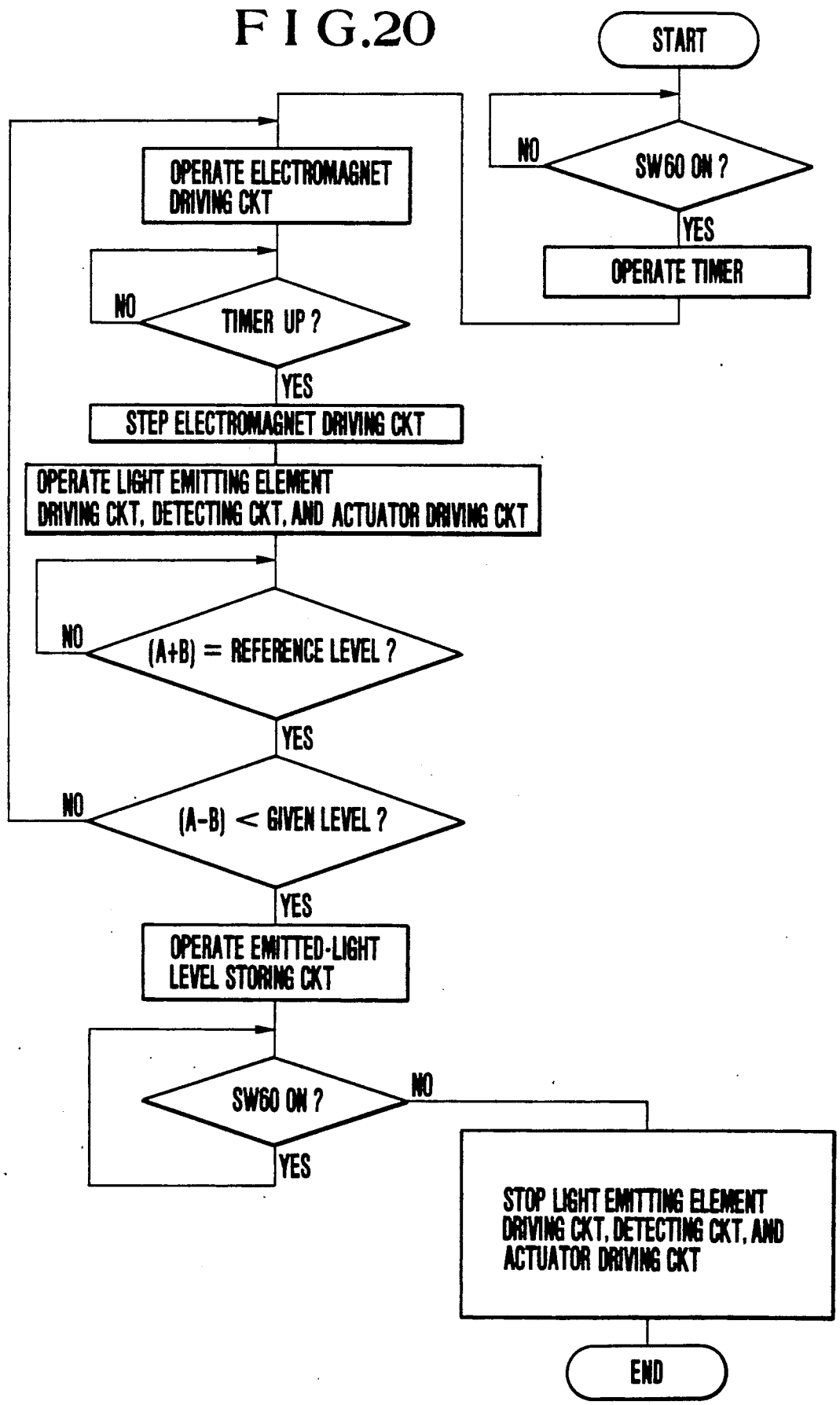
FIG. 20 is a flow chart showing a sequence of control actions to be executed by a CPU 156 of the seventh embodiment.

FIG. 20 is a flow chart showing a program to be executed by the CPU 156 of FIG. 11. In the image shake compensating device of the seventh embodiment, the mechanical arrangement is identical with the arrangement of the first embodiment. Therefore, the following describes the operation of the image shake compensating device of the seventh embodiment with reference to FIGS. 1 to 3, 6, 11 and 18 to 20:

Referring to FIG. 11, when the switch 60 is closed, the CPU 156 causes a timer incorporated therein to operate as shown in FIG. 20. Following this, the electromagnet driving circuit 57 which is interlocked with the timer is caused to operate. As a result, a current is supplied to the coil 11 of each of the electromagnets disposed within the detectors 31 and 32. The power supply to the coil 11 continues until the operation of the timer comes to an end. With the coil 11 thus energized, the yokes 8 and 9 are magnetized. The vane part of the floating body 4 is moved to a position where it is aligned with the fore ends of the yokes 8 and 9 as shown in FIG. 2. The detectors 31 and 32 is reset by this. At that moment, if the optical instrument has not been swung on its horizontal or vertical axis, the light emitting and receiving elements 13 and 14, the mirror 5 and the variable angle prism device within each of the detectors 31 and 32 are in their postures as shown in FIG. 6(a).

After the detectors 31 and 32 are reset, the CPU 156 causes the light emitting element driving circuit 158 to drive the light emitting element 13 to emit light. If the optical instrument has not been shaken at that time, the compensating optical system is not driven as the light emitting and receiving elements 13 and 14 and the mirror 5 are in the positional relation as shown in FIG. 6(a). Before describing the operation to be performed when the optical instrument is shaken, the functions and actions of the circuit elements related to the light emitting and receiving elements 13 and 14 are described as follows with reference to FIG. 19:

When the light flux emitted from the light emitting element 13 comes to the light receiving element 14, output voltages A and B are generated at the two ends of the light receiving element 14. A detection signal (A+B) is thus output from the light receiving element 14. The operational amplifier 606 compares the signal (A+B) with the reference voltage KVC. If the signal (A+B) is found to be smaller than the reference voltage KVC, the transistor 601 is operated to increase the light emitting element current. This increases the quantity of light emitted from the light emitting element 13. The quantity of light received by the light receiving element 14 also increases. The current for the light emitting element 13 increases until the signal (A+B) becomes equal to the reference voltage KVC. The light emitting element driving circuit 158 performs the above-stated action when a control signal l output from the CPU 156 is at a low level. The above-stated action is prohibited when the control signal l is at a high level. When this circuit 156 is in action, the signal (A+B) which indicates the total quantity of light received by the light receiving element 14 automatically becomes constant irrespective of the states of the detectors 31 and 32.

While the image shake compensating device is in the initial state as shown in FIG. 6(a), the relative positions of the light emitting and receiving elements 13 and 14 and the mirror 5 within each of the detectors are unconditionally determined. Then, a voltage corresponding to the current for the light emitting element 13 flowing under this condition is detected by a current detecting resistor 603. The detected voltage is sampled by the emitted-light level storing circuit 65. The voltage value is accumulated at the sample-and-hold capacitor 610. After that, the voltage value of the capacitor 610 is retained. In other words, a current value obtained in the initial state is stored.

The output (A−B) of the detecting circuit 152 becomes zero when the light flux emitted by the light emitting element 13 comes to the middle part of the light receiving element 14 (the center of the compensatable range of the compensating optical system). Therefore, while the image shake compensating device is in its initial state as shown in FIG. 6(a), the output (A−B) which is one of the outputs of the detecting circuit 152 is zero. Therefore, the driving circuit 53 for the compensating optical system driving actuator is kept in an inoperative state.

When the optical instrument is shaken, or turned round, on its horizontal or vertical axis, the tubular member 2 of the detector 31 or 32 is turned round on the axis of the floating body 4 together with the optical instrument. However, the floating body 4 is kept in its original position by the force of inertia of the liquid in the tubular member 2. As a result, a change occurs in the positional relationship between the light emitting element 13 and the mirror 5. The incident position of the light flux coming from the mirror 5 to the light receiving element 14 also changes.

FIG. 6(b) shows the condition described above. The optical instrument is in a state of having been turned round on its vertical axis, which is parallel to the pin 19a. Accordingly, the image forming lens 40 and the image forming plane 41 also slant. An image formed on the image forming plane 41 also moves from its initial image forming position P to another position Q to show an image shake. In this instance, the positions of the light receiving element 14 and the mirror 5 relative to each other also change. Meanwhile, the passing position of the light flux emitted from the light emitting element 13 and passing through the aperture 29b of the mask 29 also changes. This causes a change in the quantity of light incident on the light receiving element 14. As a result, the output (A−B) which is one of the outputs of the detecting circuit 152 is no longer zero. The other output (A+B) of the circuit 152 also changes. This causes a change in an input to the received light level detecting circuit 61. If this input is higher than the reference level KVC, the received-light level detecting circuit 61 produces an output for the light emitting element driving circuit 158. The driving current for the light emitting element 13 is either increased or decreased by this. When the emitted-light level detecting circuit 63 detects the light emitting element driving current thus obtained, a detected value thus is supplied to the determination circuit 64. The determination circuit 64 compares the current detected value of the light emitting element current with the stored value of the current obtained under the initial condition mentioned above. Through this comparison, the determination circuit 64 determines the current state of the detector, i.e., the positional relationship currently obtained among the light receiving and emitting elements 14 and 13 and the mirror 5, and that of the compensating optical system, i.e., the variable angle prism device. The operational amplifier 616 which is included in the determination circuit 64 produces from its output terminal an output as a result of comparison of the output voltage of the emitted-light level detecting circuit 63 and the terminal voltage of the capacitor 610 of the emitted-light level storing circuit 56. The output is converted into a digital value by the A/D converter 617. The digital value thus obtained is applied to the electromagnet driving circuit 57 in accordance with a control signal "n" output from the CPU 156.

Further, the electromagnet driving circuit 57 is arranged to operate under the control of the control signal applied thereto from the CUP 156. When the control signal is applied from the CPU 156, the circuit 57 is driven according to the amount of the input signal obtained from the determination circuit 64.

Meanwhile, since the other output (A−B) of the detecting circuit 152 (FIG. 11) is not zero under the condition as shown in FIG. 6(b), the output (A−B) of the detecting circuit 152 is supplied to the actuator driving circuit 53. A current corresponding to the output (A−B) then flows to the coil 23 of the actuator 33. With the coil 23 of the actuator 33 thus energized, the shaft 33a of the actuator 33 is moved forward as viewed on FIG. 2. The front frame 19 of the variable angle prism is turned round clockwise on the pin 19a (counterclockwise on the pin 19a as viewed on FIG. 6(b)). Therefore, the light receiving element 14 of the detector 32 which is carried by the front frame 19 also turns round counterclockwise on the pin 19a from its position of FIG. 6(b). When the front frame 19 is turned round until the reflection light from the mirror 5 which is secured to the floating body 4 comes to fall on the light receiving element 14 in the same incident state as its incident state obtained before the front frame 19 began to be turned round, the output (A−B) of the detecting circuit 152 (FIG. 11) becomes zero. The action of the actuator driving circuit 53 then comes to a stop. The power supply to the coil 23 of the actuator 33 also comes to a stop to bring the turning movement of the front frame 19 to a stop.

FIG. 6(c) shows the variable angle prism and the detector 32 as in their states obtained when the front frame 19 is turned round until the reflection light from the mirror 5 comes to the light receiving element 14 in the same incident state as before the commencement of the turning movement of the front frame 19. Under this condition, the pencils of rays "a", "b" and "c" incident on the variable angle prism form an image in the focal point position P of the image forming lens 40. This means that the image has been compensated for the image shake.

In order to enable the image shake compensating device to adequately cope with the conditions (a) and (b) described for the fourth embodiment in the foregoing, the seventh embodiment is arranged to control the speed of the compensating optical system when the compensating optical system is close to the limit of the compensatable range. For example, when the variable angle prism is moved near to the limit point (the left maximum inclination angle of the front frame 19) as shown in FIG. 13, the electromagnet driving circuit 57 increases the amount of power supply to the electromagnet 11 in accordance with the absolute value of the output of the determination circuit 64. This increases a magnetic urging force on the floating body 4. Therefore, the compensating speed of the compensating optical system can be lowered accordingly as the compensating optical system comes closer to the limit point of the compensatable range. Then, at the end of the compensatable range, the compensating optical system can be brought to a stop from the slowed-down speed. This arrangement effectively prevents the occurrence of a sudden large image shake at a certain point of time even in the case of the condition (a).

Further, when the compensating optical system is in one of the limit positions of the compensatable range as shown in FIG. 13, the determination circuit 64 and the electromagnet driving circuit 57 act in the above-stated manner to slowly bring the floating body 4 back to its initial position as shown in FIG. 2. The compensating optical system is thus readied for its normal compensating action. This arrangement ensures image shake compensation also under the condition (b).

The mask 29 which is disposed within each of the detectors 31 and 32 is provided with an aperture 29b having a lateral width corresponding to the compensatable range of the compensating optical system. The vertical dimension of the aperture 29b linearly varies from one end to the other. The quantity of light passing through the aperture 29b varies according to its incident position relative to the aperture 29b. Therefore, the output of the light receiving element 14 indicates the position of the compensating optical system as well as the positional relation between the light emitting and receiving elements of the detector. In the case of the seventh embodiment, therefore, the position of the compensating optical system as to whether the system is near the middle point or the limit point of its compensatable range, etc., is determined according to a change in the output of the light emitting element or the output of the light receiving element. The compensating optical system is controlled in the above-stated manner on the basis of the result of determination. The seventh embodiment is therefore capable of making image shake compensation even when complex vibrations are inflicted on the optical instrument.

Figure 21:
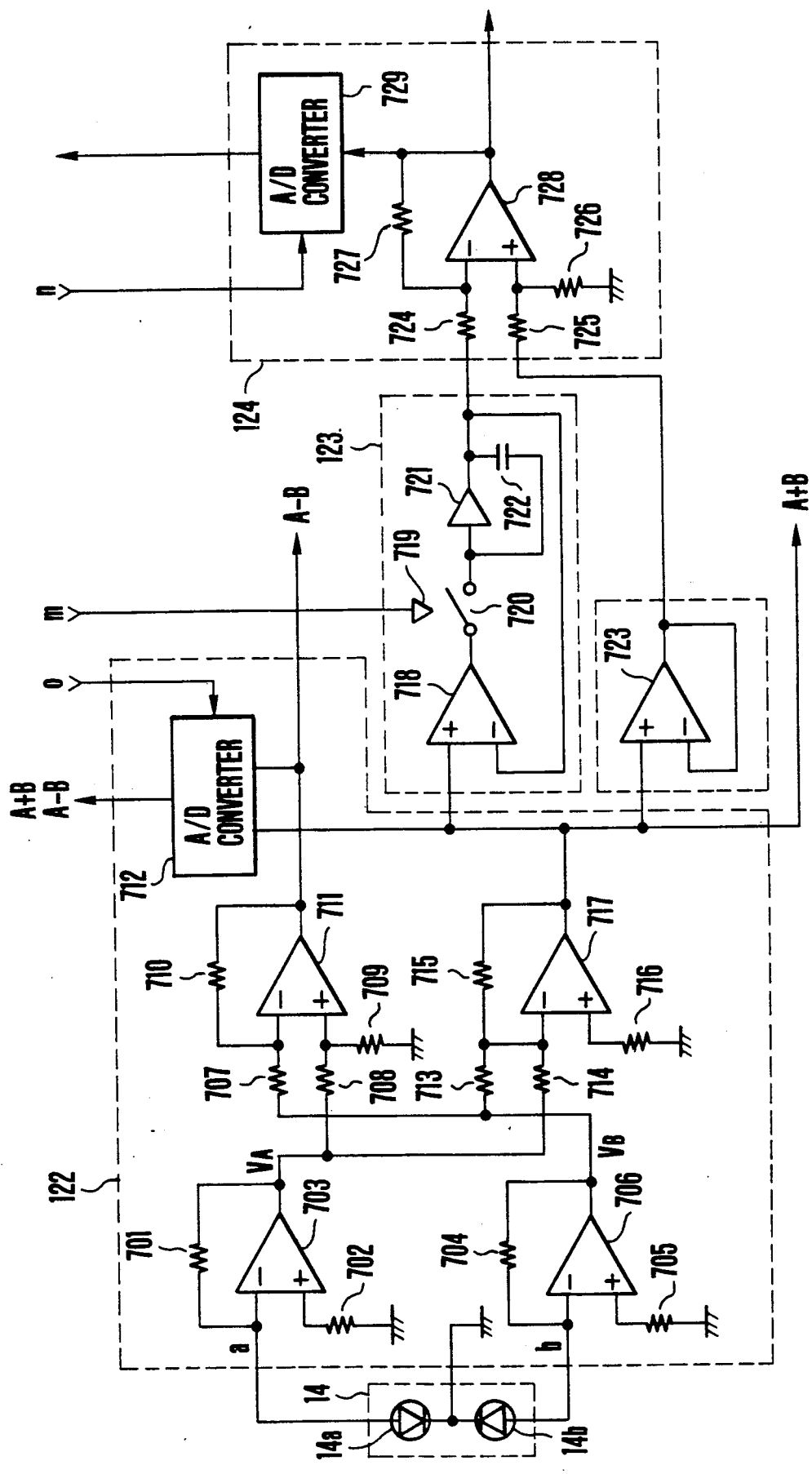
FIG. 21 is a circuit diagram showing by way of example a circuit arrangement as an eighth embodiment of the invention including a detecting circuit 122, a received-light level storing circuit 123 and a determination circuit 124.
Figure 22:
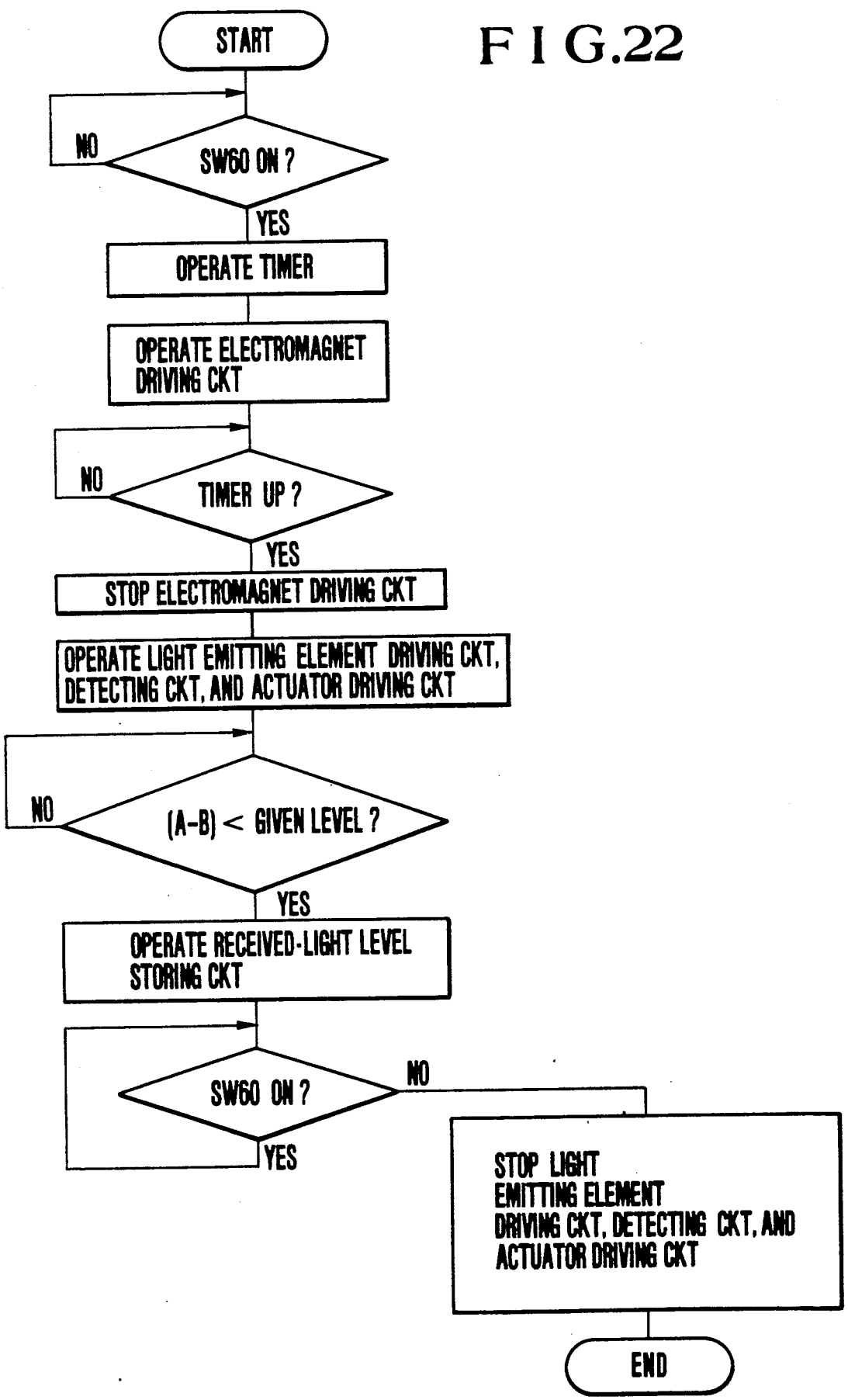
FIG. 22 is a flow chart showing a sequence of control actions to be executed by a CPU 120 included in the eighth embodiment.
Figure 24:
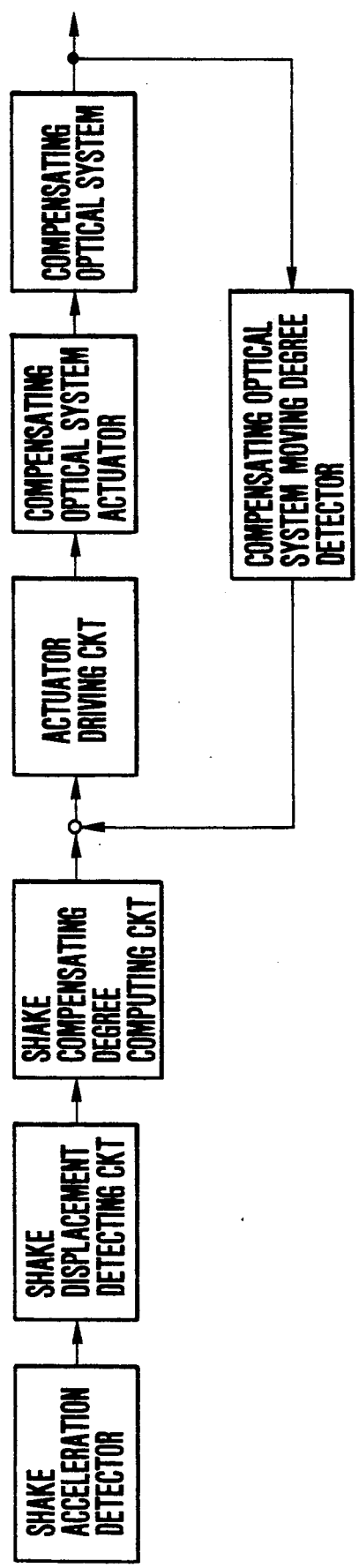
FIG. 24 is a block diagram of the control system of the conventional image shake compensating device.

FIGS. 21 and 22 show the electrical arrangement and the control program flow of an eighth embodiment of the invention. The mechanical arrangement of the image shake compensating device of the eighth embodiment is identical with that of the first embodiment and is therefore omitted from the illustration. Further, the overall circuit arrangement of the eighth embodiment is the same as that of the FIG. 14.

FIG. 21 is a circuit diagram showing by way of example the arrangement of the detecting circuit 122, the received-light level storing circuit 123 and the determination circuit 124 which detects and determines the states of the detector and the compensating optical system. Further, among the circuits shown in FIG. 21, the received-light level storing circuit 123 and the determination circuit 124 are arranged in the same manner as the received-light level storing circuit 65 and the determination circuit 64 shown in FIG. 19 respectively.

Referring to FIG. 21, an operational amplifier 703 forms a current-to-voltage converter in conjunction with resistors 701 and 702. Another operational amplifier 706 also forms a current-to-voltage converter in conjunction with resistors 704 and 705. The current-to-voltage converter which includes the operational amplifier 703 is arranged to produce a voltage VA corresponding to a current output from one element 14a of the light receiving element 14. The current-to-voltage converter which includes the operational amplifier 706 is arranged to produce a voltage VB corresponding to a current output from the other element 14b of the light receiving element 14. These voltages VA and VB are supplied to a subtracter which is composed of resistors 707 to 710 and an operational amplifier 711. The subtracter produces an output (A−B) which represents a difference between the inputs VA and VB. The voltages VA and VB are also supplied to an adder which is composed of resistors 713 to 716 and an operational amplifier 717. The adder produces an output (A+B) which represents a sum of the inputs VA and VB.

An A/D converter 712 is arranged to generate outputs which are obtained by converting the output (A−B) of the subtracter and the output (A+B) of the adder into digital values. A buffer (voltage follower) 723 is formed by an operational amplifier. An operational amplifier 718 is arranged to produce a difference between the terminal voltage (a stored value) of a storage capacitor 722 and the output voltage of the above-stated adder. A buffer 719 is arranged to receive a control signal "m" from the CPU 120. An analog switch 720 is arranged to turn on when the buffer 719 produces an output. A buffer 721 is arranged to receive the output signal of the operational amplifier 718. Resistors 724 to 727 are arranged to form a subtracter in conjunction with an operational amplifier 728. This subtracter is arranged to produce an output representing a difference between the output of the received-light level storing circuit 123 and the output (A+B) of the buffer 723. An A/D converter 729 is arranged to apply a signal output to the electromagnet driving circuit 57 (FIG. 16) upon receipt of a control signal "n" from the CPU 120.

The eighth embodiment differs from the seventh embodiment in the following points: The actuator driving circuit 53 is driven by a signal of a value (A−B)/(A+B); and the position of the compensating optical system is determined according to the output of the light receiving element. Further, the operation of circuits and the mechanical operation of the image shake compensating device are almost the same as those of the seventh embodiment and are, therefore, omitted from description.

Figure 23:
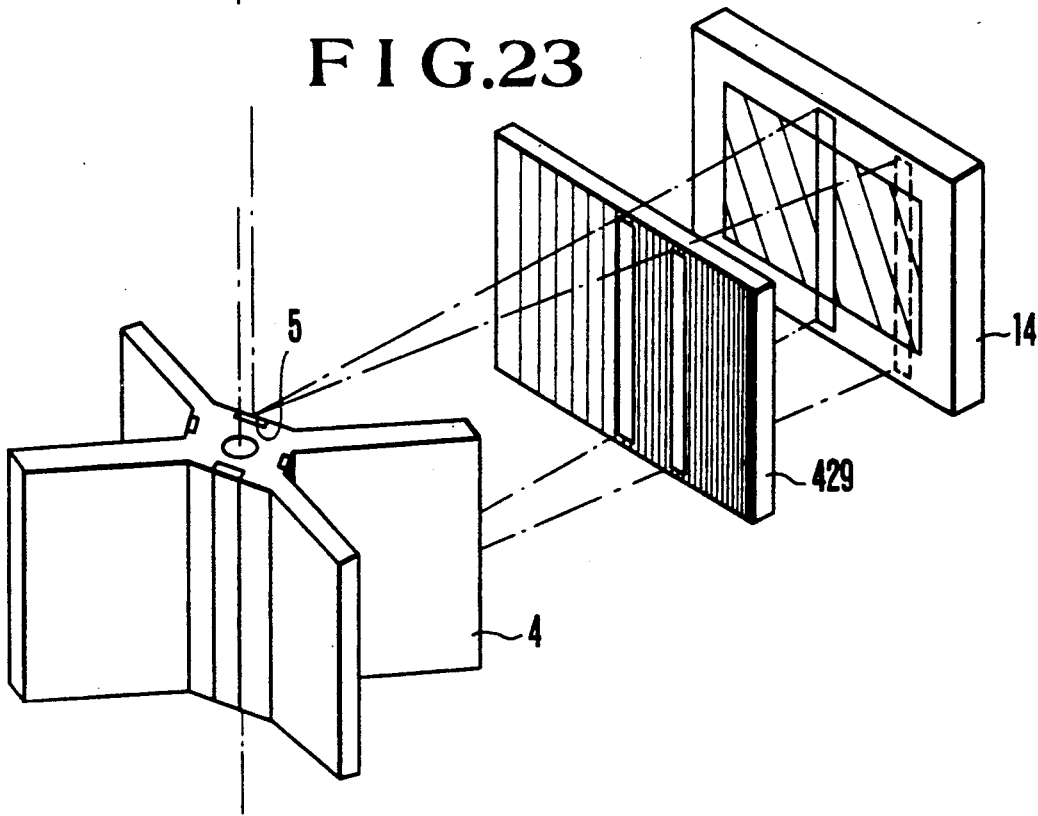
FIG. 23 shows by way of example a modification of a mask arranged within each of the detectors 31 and 32.

FIG. 23 shows an example of modification of the mask included in each of the detectors 31 and 32 of the seventh embodiment. In this case, a mask 429 is provided with no aperture nor slit. As shown in FIG. 23, the mask which has no hole is arranged to have its light transmission factor vary in the lateral direction, i.e., in the direction of the detecting action. The lateral length of the light transmitting part of the mask 429 corresponds to the compensatable range of the compensating optical system. The light flux incident on this light transmitting part causes the light receiving element 14 to produce its output corresponding to the position of the compensating optical system within the compensatable range. This mask can be elaborately manufactured in accordance with known printing technology, etc. so that the detecting accuracy of the embodiment can be enhanced. Another advantage of the mask lies in that a detection signal can be easily generated in the form of a digital signal instead of an analog signal.

In each of the fourth to eighth embodiments described in the foregoing, the detectors 31 and 32 are arranged as optical detector, each including the light emitting and receiving elements. However, the detector of course can be differently arranged without including the light emitting and receiving elements. In the embodiments, the speed and position of the compensating optical system are arranged to be controlled by changing the magnetic field for the floating body within the detector when the compensating optical system is near to the limit point of the compensatable range. This arrangement may be changed to directly control the actuator.

Further, the output of the determination circuit which determines the state of the compensating optical system may be arranged to be supplied to some suitable display device to allow the operator of the optical instrument to know the state of the compensating optical system. Further, the above-stated optical mask may be replaced with a magnetic mask or the like.

In each of the embodiments described, the image shake compensating device is arranged to use the hydrostatic sensors as detectors. However, it will be apparent to those skilled in the art that detectors of different kinds may be used in place of the hydrostatic sensors without departing from the scope and spirit of the invention.

In the above-stated embodiments, the operation of the electromagnet driving circuit 57 for resetting the detectors 31 and 32 in response to the turning-on operation of the start switch 60 is stopped when the counting operation of the timer comes to an end. However, the electromagnet driving circuit 57 may continue operating without alteration or with its acting force weakened even after the counting operation of the timer comes to an end. In this case, the operation of the electromagnet driving circuit 57 for returning the compensating optical system from the compensatable limit position to the initial position as described in the above embodiments needs to be continued with the acting force of the electromagnet driving circuit 57 strengthened.

What is claimed is:

1. An image shake compensating device comprising:
   a) compensating means for compensating for an image shake taking place on an image forming plane of an optical instrument, said compensating means associating with a displacement of said optical instrument;
   b) detection means for detecting a shaking state of said optical instrument which causes said image shake by the displacement state of said compensating means associating with a displacement of said optical instrument; and
   c) driving means for driving said compensating means relative to said optical instrument in response to an output of said detection means.

2. A device according to claim 1, wherein said detection means includes a first detecting part arranged to change its position in association with the displacement of said compensating means in detecting the displacement state of said compensating means.

3. A device according to claim 2, wherein said first detecting part includes optical means.

4. A device according to claim 2, wherein said first detecting part includes magnetic means.

5. A device according to claim 2, wherein said detection means includes a second detecting part arranged to be not changing its position in association with the displacement of said compensating means in detecting the displacement state of said compensating means.

6. A device according to claim 5, wherein said second detecting part includes optical means.

7. A device according to claim 5, wherein said second detecting part includes magnetic means.

8. A device according to claim 5, further comprising judgment means for judging a displacement state of said compensating means relative to said optical instrument, said judgment means returning said compensating means to its initial position relative to said optical instrument by changing a position of said second detecting part in association with the displacement of said compensating means when a displacement position of said compensating means relative to said optical instrument approaches a limit.

9. A device according to claim 8, wherein said detection means projects and receives light between said first detecting part and said second detecting part and includes mask means for changing its output in accordance with a change of a relative position between said first detecting part and said second detecting part, and wherein said judgment means includes means for judging a displacement state of said compensating means relative to said optical instrument in accordance with a change of an output of said detection means.

10. A device according to claim 1, wherein said compensating means includes means which is able to change its position relative to said optical instrument.

11. A device according to claim 10, further comprising judgment means for judging a displacement state of said compensating means relative to said optical instrument.

12. A device according to claim 11, wherein said judgment means includes returning means for returning said compensating means to its initial position relative to said optical instrument when a displacement position of said compensating means relative to said optical instrument approaches a limit.

13. A device according to claim 12, wherein said returning means includes means for acting when said compensating means reaches a predetermined position to approach said limit.

14. A device according to claim 12, wherein said returning means includes means for heightening the degree of its action as said compensating means approaches said limit.

15. A camera having an image shake compensating device comprising:
   a) compensating means for compensating for an image shake taking place on an image forming plane of a camera, said compensating means associating with a displacement of said camera;
   b) detection means for detecting a shaking state of said camera which causes said image shake by the displacement state of said compensating means associating with a displacement of said camera; and
   c) driving means for driving said compensating means relative to said camera in response to an output of said detection means.

16. A camera according to claim 15, wherein said detection means includes a first detecting part arranged to change its position in association with the displacement of said compensating means in detecting the displacement state of said compensating means.

17. A camera according to claim 16, wherein said first detecting part includes optical means.

18. A camera according to claim 16, wherein said first detecting part includes magnetic means.

19. A camera according to claim 16, wherein said detection means includes a second detecting part arranged to be not changing its position in association with the displacement of said compensating means in detecting the displacement state of said compensating means.

20. A camera according to claim 19, wherein said second detecting part includes optical means.

21. A camera according to claim 19, wherein said second detecting part includes magnetic means.

22. A camera according to claim 15, wherein said compensating means includes means which is able to change its position relative to said camera.

23. A camera according to claim 22, further comprising judgment means for judging a displacement state of said compensating means relative to said camera.

24. A camera according to claim 23, wherein said judgment means includes returning means for returning said compensating means to its initial position relative to said camera when a displacement position of said compensating means relative to said camera approaches a limit.

25. A camera according to claim 24, wherein said returning means includes means for acting when said compensating means reaches a predetermined position to approach said limit.

26. A camera according to claim 24, wherein said returning means includes means for heightening the degree of its action as said compensating means approaches said limit.

27. A camera according to claim 19, further comprising judgment means for judging a displacement state of said compensating means relative to said camera, said judgment means returning said compensating means to its initial position relative to said camera by changing a position of said second detecting part in association with the displacement of said compensating means when a displacement position of said compensating means relative to said camera approaches a limit.

28. A camera according to claim 27, wherein said detection means projects and receives light between said first detecting part and said second detecting part and includes mask means for changing its output in accordance with a change of a relative position between said first detecting part and said second detecting part, and wherein said judgment means includes means for judging a displacement state of said compensating means relative to said camera in accordance with a change of an output of said detection means.

* * * * *